US007346584B2

(12) United States Patent
Hamada et al.

(10) Patent No.: US 7,346,584 B2
(45) Date of Patent: *Mar. 18, 2008

(54) CONTENTS DISTRIBUTION SYSTEM FOR HANDLING SECONDARY PRODUCTS UTILIZING RAW MATERIAL CONTENTS

(75) Inventors: Shinichiro Hamada, Kanagawa (JP); Toshibumi Seki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 11/358,075

(22) Filed: Feb. 22, 2006

(65) Prior Publication Data

US 2006/0143128 A1 Jun. 29, 2006

Related U.S. Application Data

(63) Continuation of application No. 09/962,149, filed on Sep. 26, 2001, now Pat. No. 7,035,826.

(30) Foreign Application Priority Data

Sep. 29, 2000 (JP) ............................. 2000-301379

(51) Int. Cl.
*G06Q 99/00* (2006.01)
(52) U.S. Cl. ........................................ 705/51; 713/165
(58) Field of Classification Search ................. 705/22, 705/26–27, 39–40, 50–59, 77; 380/200–203, 380/231–233; 713/165–169, 193; 707/100–104
See application file for complete search history.

(56) References Cited

U.S. PATENT DOCUMENTS 5,499,298 A * 3/1996 Narasimhalu et al. ........ 705/54

| 5,864,620 A | 1/1999 | Pettitt |
| 5,933,498 A | 8/1999 | Schneck et al. |
| 6,076,077 A | 6/2000 | Saito |

(Continued)

FOREIGN PATENT DOCUMENTS

EP 1193620 A2 4/2002

(Continued)

OTHER PUBLICATIONS

Levine, Martin, "Video Disk Drives Come of Age", Multichannel News, v20 n51, p. 149, Dec. 1999, ISSN: 0276-8593.*

(Continued)

*Primary Examiner*—Mary D. Cheung
(74) *Attorney, Agent, or Firm*—Oblon, Spivak, McClelland, Maier & Neustadt, P.C.

(57) ABSTRACT

A contents distribution system uses a copyright rental use scheme in which the economical burden on the users at a time of utilizing contents can be reduced to a reasonable level, and appropriate fees can be collected for the copyrights of the contents created and provided at each stage by the raw material creators and the secondary product creators. In this system, the secondary product creator can create the secondary product contents by incorporating the raw material contents for free, and sell the secondary product contents. The end-user pays respective utilization fees to the secondary product creator and each raw material provider at a time of the purchasing the secondary product contents.

24 Claims, 14 Drawing Sheets

U.S. PATENT DOCUMENTS

| | | |
|---|---|---|
| 6,209,097 B1 | 3/2001 | Nakayama et al. |
| 6,647,417 B1 * | 11/2003 | Hunter et al. ............... 709/225 |
| 6,658,568 B1 | 12/2003 | Ginter et al. |

FOREIGN PATENT DOCUMENTS

| | | |
|---|---|---|
| JP | 10-302006 | 11/1998 |
| JP | 11-102396 | 4/1999 |
| JP | 11-250145 | 9/1999 |
| JP | 11-283327 | 10/1999 |
| JP | 2000-194589 | 7/2000 |
| WO | WO9808344 A2 * | 2/1998 |

OTHER PUBLICATIONS

Z, Kitagawa, "Electronic Copyright Management System and Copymart," Journal IPSJ, vol. 38, No. 8, pp. 663-668, Aug. 1997 (w/English translation).

Chiharu Kagami, et al., "Matryoshka—An Autonomous Capsule for Content Usage Management", Information processing society research report, Japan, Information processing society of Japan, vol. 2000, No. 30, Mar. 22, 2000, pp. 99-104 (with English Abstract).

* cited by examiner

DISTRIBUTION FORMAT 20A

CONFIGURATION FORMAT 20B

FIG.5

```
<html>
<body>
<h1>MAJOR TOPICS OF THIS WEEK</h1>
<h2>Best1</h2>
<div>
<h1>xxx<!--title-->xxx</h1>
<p>xxx<!--body-->xxx</p>
</div>
<h2>Best2</h2>
<div>
<font size="+3"><b>
xxx<!--title-->xxx
</b></font>
xxx<!--body-->xxx
</div>
</body>
</html>
```

REPRODUCTION FORMAT 20C

FIG.12A

```
contract
{
when(?[container][==charging) {
 profile{
  price:     100yen;
  processor: "http://www.shokudouz.com/or der.cgi";
  style:     "http://www.shokudouz.com/or der.xsl";
  card-company:{"visa","master" };
 }
 requirements {
  client-name.
  client-address.
  client-phoneno.
  card-company.
  card-account.
  carduser-name=client-name.
  carduser-address=client-address.
  carduser-phoneno=client-phoneno.
 }
otherwise{
 profile{ price:0yen;}
 requirements{}
}
};
```

1  [ ¥100 WILL BE CHARGED FOR COMMERCIAL USE BUT FREE FOR NON-COMMERCIAL USE ]

FIG.12B

```
contract
{
 profile{
  price:     1000yen;
  processor: "http://www.hogemagazine.com/or der.cgi";
  style:     "http://www.hogemagazine.com/or der.xsl";
  card-company:{"visa","master"};
 }
 requirements {
  client-name.
  client-address.
  client-phoneno.
  card-company.
  card-account.
 }
 action {
  when(%1* [containee]   ==charging){
   %1〈client-name      =this->client-name.
     client-address    =this->client-address.
     client-phoneno    =this->client-address.
     card-company      ="visa".
     card-account      ="xxx-xxxxx".
     carduser-name     ="hoge  magazine".
     carduser-address  ="xxxx xxxxx".
     carduser-phoneno  ="xxx-xxxx-xxxx.
 }
};
```

2  [ ¥1000 WILL BE CHARGED OVERALL & ALL RAW MATERIAL FEES FOR COMPOSITE CONTENTS WILL BE PAID BY SECONDARY PRODUCT CREATOR ]

CONTENTS DISTRIBUTION SYSTEM FOR HANDLING SECONDARY PRODUCTS UTILIZING RAW MATERIAL CONTENTS

This application is a continuation application of Ser. No. 09/962,149, filed Sep. 26, 2001 now U.S. Pat. No. 7,035,826, which is incorporated herein by reference.

BACKGROUND OF THE INVENTION

1. Field of the Invention

The present invention relates to a contents distribution system for facilitating extensive contents utilization, and enabling production and sales of contents in a form of a secondary product constructed as a work incorporating charged contents as raw material contents.

2. Description of the Related Art

Nowadays, due to the advance and spread of the computer networks such as WWW (World Wide Web) and the improved performances of network terminals, it becomes possible to easily exchange an enormous amount of digital contents (software) such as text, music, video, computer programs, etc., without any geographical limitation. Namely, by providing a server connected to a network such as WWW and storing contents in this server such that they can be distributed from there, it becomes possible to download and utilize these contents anywhere on the network. This can be regarded as a distribution revolution realized by the network distribution in the field of the contents distribution.

In the past, the charged contents such as text, music, video, computer programs, etc. have been shipped as products in forms of articles having some shape and size using papers, magnetic medium, optical medium, etc., and merchandized through distribution retailers of retail stores, telephone order centers, etc. Now, it becomes possible to merchandize these contents by the network distribution so that the users can purchase them any time anywhere, without worrying about the store hours or distances.

When such an environment becomes available, the next important stage is to develop a technique for mechanically realizing a fee collecting mechanism. Such a mechanical charging technique for the charged contents (software) distributed through the network is expected to become very important in future, because it can free the distribution cost and the labor cost related to the charging processing and it can theoretically eliminate the illegal use of the charged contents.

A typical known contents charging system has been disclosed in Japanese Patent Application Laid Open No. 11-283327 (1999).

Briefly, this system operates as follows. At a time of distribution, the contents are distributed in a data format containing the encrypted contents and a contract term regarding the reproduction (this data format will be referred to as "distribution format"), and at a time of reproduction, the contents are reproduced by decrypting them by using a key that can be acquired in exchange to the execution of the contract (this state will be referred to as "reproduction format"). This system can handle the contents utilization model in which the contents utilization right can be purchased by paying the appropriate fee. Here, this type of contents utilization style will be referred to as "buy up scheme".

In this known contents charging system, because the "buy up scheme" is used, the transaction will be completed when the sales agreement is made and the contents are delivered. In the case of selling the contents produced from nothing, there is only one contents creator so that the processing by which the contents user pays the fee to the contents creator can be handled by this known contents charging system.

Although rather rare in the case of music, painting, etc., it is a fairly common practice in the case of Web pages, 3D computer graphics, etc., to purchase the charged contents of the others and produce another new work by incorporating the purchased contents as raw material contents. In such cases, the style of transaction has been such that the secondary product creator buys up the right to use each raw material contents to be used in the new work from the raw material provider (raw material creator) and sells the new work that utilizes the purchased raw material contents, that is, the merchandizing is completed at each contents transaction stage, so that the entire contract processing can be handled without any problem by the above described known contents charging system even in this style of transaction.

Note that, in the above, a creator of the raw material contents is referred to as the raw material provider and a creator of a work that utilizes the provided raw material contents is referred to as a secondary product creator. Also, in the following, the contents created by a single creator will be referred to as genuine contents and the contents produced by incorporating raw material contents will be referred to as composite contents, for the sake of explanation.

In the case of the "buy up scheme", the sales price of the raw material is estimated according to the expected cumulative profit of the secondary product creator resulting from the use of that raw material, and the customers are limited to the secondary product creators, that is, the market is small, so that there is a natural tendency to set a rather high price. For this reason, the system using the "buy up scheme" will require the users to endure the unreasonably high economical burden so that it is impractical to expect a significant increase of the users in terms of the business and therefore it is likely to become a system with rather poor future prospect.

Note that the re-use oriented contents utilization style and distribution market in the open world in which users can create secondary products by editing and processing primary contents on general purpose PCs is known as "contents recycling market". However, even this system cannot provide a mechanism in which the burden on the users at a time of utilizing the contents is reduced to a reasonable level.

In the case of creating the contents, the creator can adopt either an original creation style in which the entire contents are developed independently or a secondary processing style in which the raw materials are purchased from the raw material providers and the desired contents are constructed by using the purchased raw materials.

In the case of adopting the original creation style, the contents development cost and time can be enormous, whereas in the case of adopting the secondary processing style, the time required for the contents development can be reduced so that the contents in good quality can be developed in short time at a relatively low cost. However, in the latter case, the raw materials to be utilized must be purchased so that there is a need to consider a balance among the initial investment for purchasing the raw materials, the cost required in creating the secondary product, and the market demands for the created secondary product, which could be a factor for preventing the utilization of the raw materials.

Even in the "contents recycling market" which is the re-use oriented contents utilization style and distribution market in which the secondary products can be created by the secondary processing of the purchased raw materials and the resulting secondary products can then be provided as charged raw materials, the secondary product creator who utilizes the raw materials must purchase the raw materials to be utilized so that there is a considerable financial burden on the secondary product creator. Namely, the idea of the "contents recycling market" is aimed at providing a mechanism for recycling the contents as a work, and the creators of the raw materials to be provided to the secondary product creators naturally tend to ask for the high sales prices for the raw materials in view of the expected sales volumes, especially when the raw materials to be provided are highly sophisticated ones.

This fact makes it difficult to break the vicious circle of requiring the heavy raw material purchasing burden on the secondary product creators, raising the sales prices of the secondary product contents, and lowering the sales volumes as a result.

BRIEF SUMMARY OF THE INVENTION

It is therefore an object of the present invention to provide a contents distribution system in which the economical burden of the secondary product creators can be reduced, the burden on the users at a time of utilizing the contents created by the secondary product creators can be reduced to a reasonable level, and the sales volumes can be increased for both the raw material providers and the secondary product creators, such that a remarkable expansion of the business becomes possible.

According to one aspect of the present invention there is provided a contents distribution system for enabling utilization of a secondary product contents containing one or more raw material contents which are encrypted by using an encryption key and to which an information for a contract procedure to enable utilization of the raw material contents is attached, the contents distribution system comprising: a server device configured to maintain the encryption key of the raw material contents; and a client device configured to acquire the encryption key of the raw material contents from the server device, decrypt the raw material contents by using the encryption key and enable the utilization of the secondary product contents, by executing the contract procedure according to the information for the contract procedure attached to the raw material contents when the utilization of the secondary product contents is specified.

According to another aspect of the present invention there is provided an information processing device for enabling utilization of a secondary product contents containing one or more raw material contents which are encrypted by using an encryption key and to which an information for a contract procedure to enable utilization of the raw material contents is attached, the information processing device comprising: an execution unit configured to execute the contract procedure according to the information for the contract procedure attached to the raw material contents when the utilization of the secondary product contents is specified; and a processing unit configured to acquire the encryption key of the raw material contents from a server that maintains the encryption key of the raw material contents, decrypt the raw material contents by using the encryption key and enable the utilization of the secondary product contents when the contract procedure is executed by the execution unit.

According to another aspect of the present invention there is provided a contents distribution method for enabling utilization of a secondary product contents containing one or more raw material contents which are encrypted by using an encryption key and to which an information for a contract procedure to enable utilization of the raw material contents is attached, the contents distribution method comprising: (a) maintaining the encryption key of the raw material contents at a server device; and (b) acquiring the encryption key of the raw material contents from the server device, decrypting the raw material contents by using the encryption key and enabling the utilization of the secondary product contents, by executing the contract procedure according to the information for the contract procedure attached to the raw material contents at a client device when the utilization of the secondary product contents is specified.

According to another aspect of the present invention there is provided a computer program product for causing a computer to function as an information processing device for enabling utilization of a secondary product contents containing one or more raw material contents which are encrypted by using an encryption key and to which an information for a contract procedure to enable utilization of the raw material contents is attached, the computer program product comprising: first computer program codes for causing the computer to execute the contract procedure according to the information for the contract procedure attached to the raw material contents when the utilization of the secondary product contents is specified; and second computer program codes for causing the computer to acquire the encryption key of the raw material contents from a server that maintains the encryption key of the raw material contents, decrypt the raw material contents by using the encryption key and enable the utilization of the secondary product contents when the contract procedure is executed by the first computer program codes.

According to another aspect of the present invention there is provided a method for providing a contents distribution service, comprising: providing a secondary product contents containing one or more raw material contents which are encrypted by using an encryption key and to which an information for a contract procedure to enable utilization of the raw material contents is attached, the secondary product contents being created by a secondary product creator without paying any raw material fees to raw material providers of the raw material contents; executing the contract procedure according to the information for the contract procedure attached to the raw material contents when the utilization of the secondary product contents is specified; and acquiring the encryption key of the raw material contents from a server device that maintains the encryption key of the raw material contents at a server device, decrypting the raw material contents by using the encryption key and enabling the utilization of the secondary product contents, when an end-user of the secondary product contents pays a raw material fee to each raw material provider of each raw material contents upon executing the contract procedure for each raw material contents.

Other features and advantages of the present invention will become apparent from the following description taken in conjunction with the accompanying drawings.

BRIEF DESCRIPTION OF THE DRAWINGS

FIG. 5 is a diagram showing an exemplary Web page contents in a reproduction format that can be used in the contents distribution system of FIG. 1.

FIGS. 12A and 12B are diagrams showing exemplary descriptions written in a contract definition language (CDL) that can be used in the contents distribution system of FIG. 1 and FIG. 6.

DETAILED DESCRIPTION OF THE INVENTION

Figure 1:
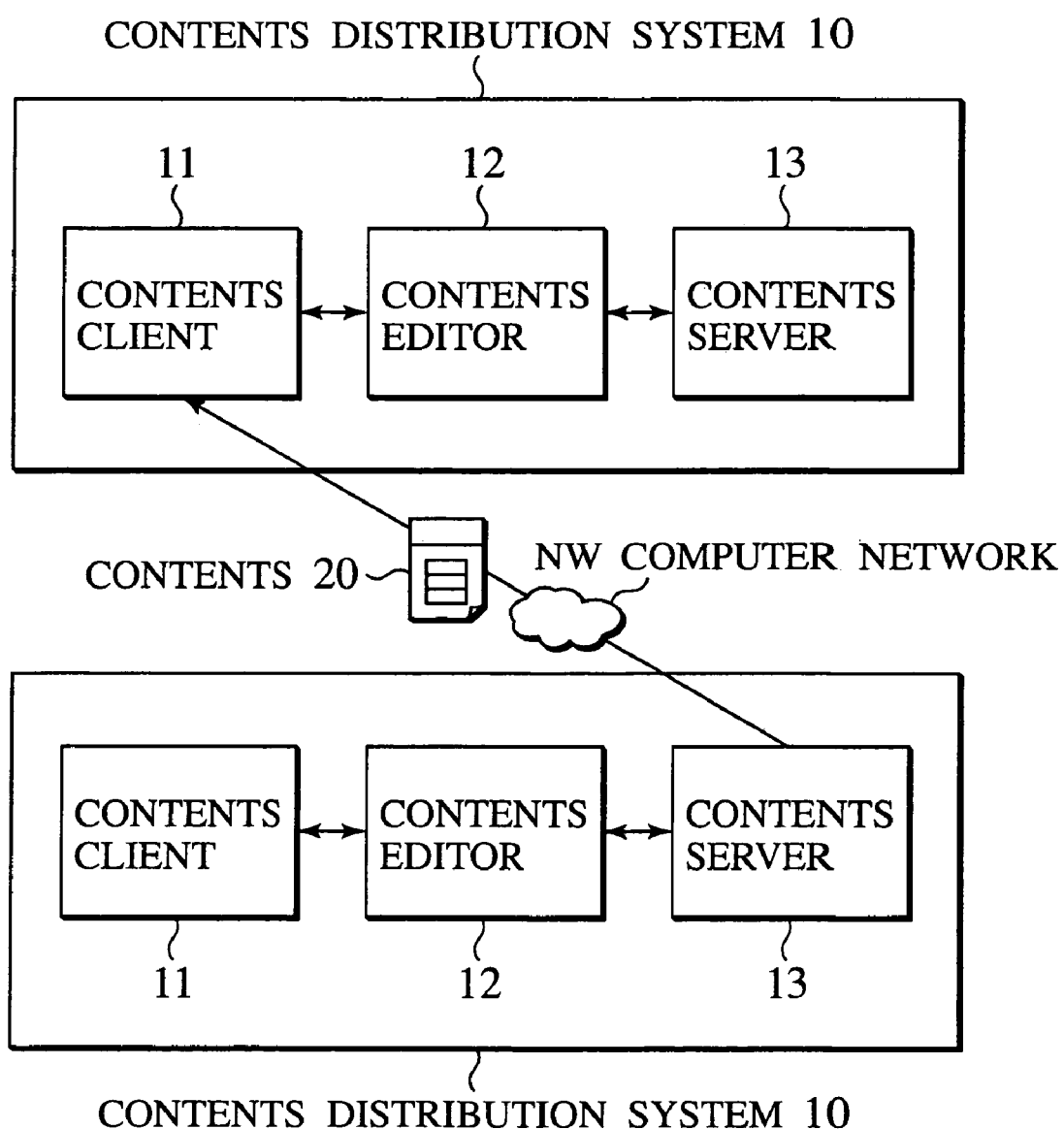
FIG. 1 is a block diagram showing an exemplary configuration of a contents distribution system according to one embodiment of the present invention.

Referring now to FIG. 1 to FIG. 14, one embodiment of a contents distribution system according to the present invention will be described.

First, the operation principle underlying the present invention will be described.

The present invention is directed to a mechanism which is applicable to the contents distribution style in which new contents can be created by the secondary processing of the purchased contents and then sold, which can enable each contents creator to provide the created contents at low prices, and which can realize the remarkable increase of the sales volume, as well as a system for realizing this mechanism on the Internet.

(Basic Concepts of the Present Invention)

In the present invention, the economical burden on the users at a time of utilizing contents can be reduced to a reasonable level, and appropriate fees can be collected for the copyrights of the contents created and provided at each stage by the raw material creators and the secondary product creators. Here, a new contents utilization business method called "copyright rental use scheme" is proposed, and a charging system for carrying out the charging processing as a support to the contents utilization business in the copyright rental use scheme is proposed.

The copyright rental use scheme proposed here is a mechanism in which, when the secondary product creator creates new contents by utilizing raw material contents provided by a third person, the utilization fee of the secondary product contents that includes the utilization fee of the raw material contents will be paid by a user of the secondary product contents which is the final work. In other words, this is a contents utilization scheme in which "the secondary product creator transfers the payment for the raw material utilization right to the end-user of the secondary product" such that the end-user pays the utilization fee of each contents at the final utilization stage, but the secondary product creator who utilizes the raw material contents need not pay the utilization fee at the intermediate stage, that is, the utilization fee of the raw material contents.

In short, this is a business model in which it is the end-user, not the secondary product creator, who eventually purchases the raw material contents, and the secondary product creator can creates the secondary product contents by incorporating the raw material contents for free, and sell the secondary product contents. The end-user of the secondary product contents pays respective utilization fees to the secondary product creator and each raw material provider at a time of the purchasing the secondary product contents.

In the case of adopting the copyright rental use scheme with respect to the contents, it is the end-user of the contents who purchases the raw materials. There are far greater number of end-users of the contents compared with the secondary product creators, so that the wider utilization of the contents can be promoted and therefore the increase in the number of users can be expected. For this reason, there is an advantage that the raw material provider can suppress the raw material sales price low and yet increase the gross sales.

On the other hand, it is possible to expect a synergy effect that the secondary product creator can utilize the raw materials without any initial investment so that it becomes possible to utilize the raw materials actively and the secondary product with improved contents can be provided at low cost, while it becomes possible for the end-user to utilize the product in good quality.

In the conventional contents utilization business model using the buy up scheme which is the general commerce practice, there is a need to compare the initial investment required for the raw materials with the effort required for the creation plus the sales of the created product, which could be a factor for preventing the raw material utilization.

For these two reasons, the contents utilization business model using the copyright rental use scheme proposed by the present invention can be considered as a very effective model for the contents raw material sales business.

No such business model has been known in the real world. One of the possible reasons for explaining this fact is that, even if such a business model is contemplated in the real word, there is no reasonable way for the raw material provider to surely collect the raw material fee from the end-user.

Another possible reason is that, in the copyright rental use scheme, the end-user who is a customer must pay respective utilization fees to a plurality of copyright holders and this will increase the burden of the end-user invisibly in a form of time and effort required for the payments, so that it is not easily acceptable as a sales style.

However, in the present invention system, the former problem is resolved by theoretically guaranteeing the accurate monitoring of all the transaction acts, and the latter problem is resolved by providing an operation assistant mechanism for unifying the payments.

Now, in the real world, the license type charging model in which each copyright holder receives the income according to the sales of the work such as the royalty with respect to the published work like music CD or book is also often employed. The contents utilization model using the copyright rental use scheme can emulate such a license type charging model as well. For example, in the case of music CD, it is possible to consider the model in which prices for respective raw material contents provided by copyright holders such as a songwriter, a composer, an arranger, and a singer can be set in advance, and the music CD can be regarded as contents constructed from these raw material contents.

Note that the concept described above is directed to the business world based on an assumption that there is no charging between the secondary product creator and the raw material provider, but in practice, there can be cases where the raw material provider wishes to collect some rental fee (corresponding to the neighboring rights) from the secondary product creator depending on the power relationship between the raw material and the secondary product such as a name value difference or a share difference, or conversely there can be cases where it is more appropriate for the raw material provider to pay an advertisement fee to the secondary product creator in a sense that the incorporation of the raw material in the secondary product can promote the sales of the raw material.

For this reason, the monetary transaction between the secondary product creator and the raw material provider can be made possible in such a real business world. As will be described in further detail below, as an application of this function, it is also possible to make such a contract that, \100 will be charged if the own contents are incorporated into the other contents as a raw material and the other contents are intended for the purpose of the commercial use, but there is no charge if the other contents are intended for non-commercial use, for example.

Besides that, it is also possible to consider the extension in which it is possible to specify the number of times or the period of time for which the contents can be reproduced by introducing a concept of the lifetime, i.e., the valid period, with respect to a key for decrypting the contents. By setting the available period, it is possible to realize the utilization environment in which the contents can be provided to the user at lower price.

Next, one embodiment of a specific system for realizing the business on the Internet or the like, for example, in which the basic concepts of the present invention are introduced by applying principles described above will be described in detail.

One aspect of this system can be viewed as a "contents distribution system", which is a middleware related to the network that is aimed at executing contracts and exchanging contents through HTTP (a protocol used in the World Wide Web). In this system, the URL at which a Web page for executing contract terms is located will be used for a contract description. Consequently, it is possible to include arbitrary contract terms apart from that regarding the charging, such as those regarding user registration, questionnaire, etc. On the other hand, in this system, it is impossible to realize the monetary transaction or the like between the raw material provider and the secondary product creator which is described above as a preferable additional feature. The contents to be handled in this case are arbitrary.

Another aspect of this system can be viewed as a "contents charging system", which can be realized as an extension of the contents distribution system, in which highly descriptive CDL (Contract Definition Language) that is designed for this system will be used for a contract description instead of the URL. As a result, the contract that can be handled in this system will be limited to the charging contract, but it becomes possible to utilize a complicated charging contract. It is also possible to introduce a user agent (operation assistant system) regarding the payments. For example, the payments for the same composite contents can be unified and made automatic, and services such as monitoring and warning of the charging state can be provided.

First, the contents distribution system according to this embodiment will be described.

<Contents Distribution System>

FIG. 1 shows an overall configuration of the contents distribution system 10 according to this embodiment, which comprises at most three sub-systems including a contents client 11, a contents editor 12, and a contents server 13. A plurality of contents distributions systems 10 connected through a computer network NM form a distribution system for contents 20 that can be exchanged between them.

Note that it is also possible to use a configuration for distributing contents by conveying media. Note also that three sub-systems are independent from each other and it is not absolutely necessary to provide them all. For example, in the case of a user who only enjoys the contents (which will be referred to as an end-user hereafter), it suffices to provide the contents client 11 alone.

As already mentioned above, a typical known contents charging system has been disclosed in Japanese Patent Application Laid Open No. 11-283327 (1999). In this system, at a time of distribution, the contents are distributed in a data format containing the encrypted contents and a contract term regarding the reproduction (this data format will be referred to as "distribution format"), and at a time of reproduction, the contents are reproduced by decrypting them by using a key that can be acquired in exchange to the execution of the contract (this state will be referred to as "reproduction format"). This system is in the charging model called "but up scheme" in which the contents are purchased by paying the appropriate fee.

In contrast, the contents distribution system of this embodiment adopts the copyright rental use scheme which is a charging model in which the fee payment obligation for the raw material utilization right is transferred from the secondary product creator to the end-user, so that a "configuration format" is introduced as the contents data format in addition to the distribution format and the reproduction format. This contents data format called "configuration format" is a data format which contains a plurality of contents that are maintained in their distributed states as well as data for managing these constituent distributed contents, which is to be utilized instead of the distribution format at a time of the distribution.

As will be described below, a component that produces data in this "configuration format" is an archiver 121 shown in FIG. 6 that is contained in the contents editor 12, and a component that converts the distributed data in the "configuration format" into data in the "reproduction format" is a recomposer 111/122 shown in FIG. 6.

Here, these data formats will be described briefly with references to FIGS. 2A and 2B and FIG. 3. Note that the data with the data structure in the reproduction format are just raw contents.

Figure 2A:
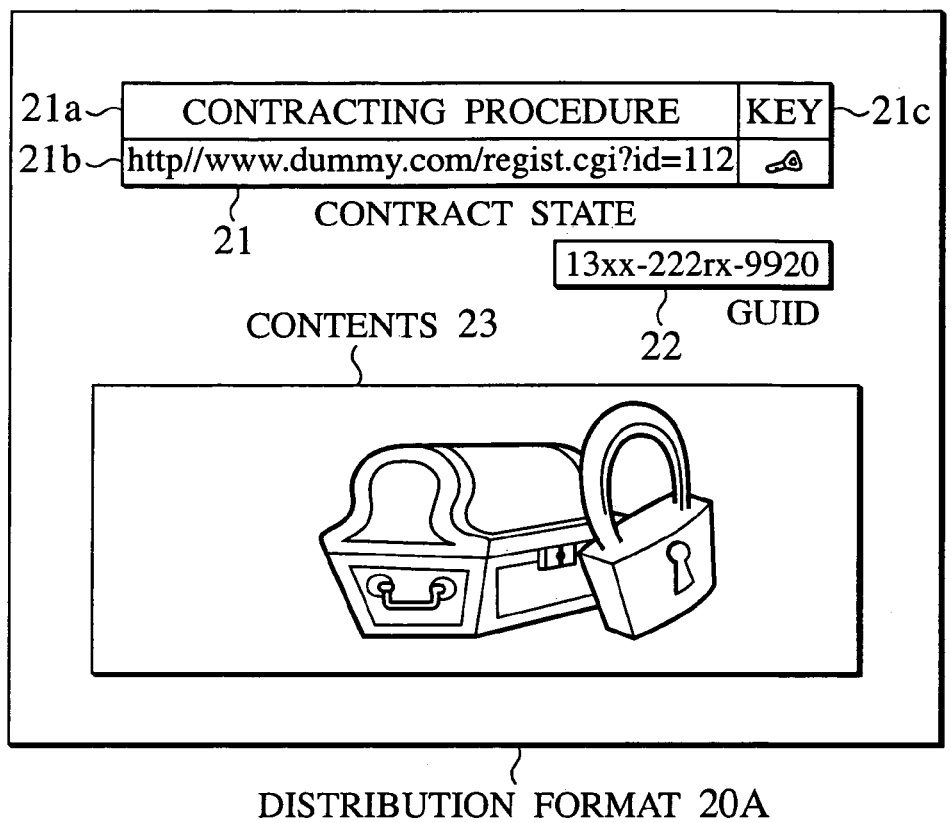
FIGS. 2A and 2B are diagram showing exemplary data in a distribution format and a configuration format respectively that can be used in the contents distribution system of FIG. 1.
Figure 2B:
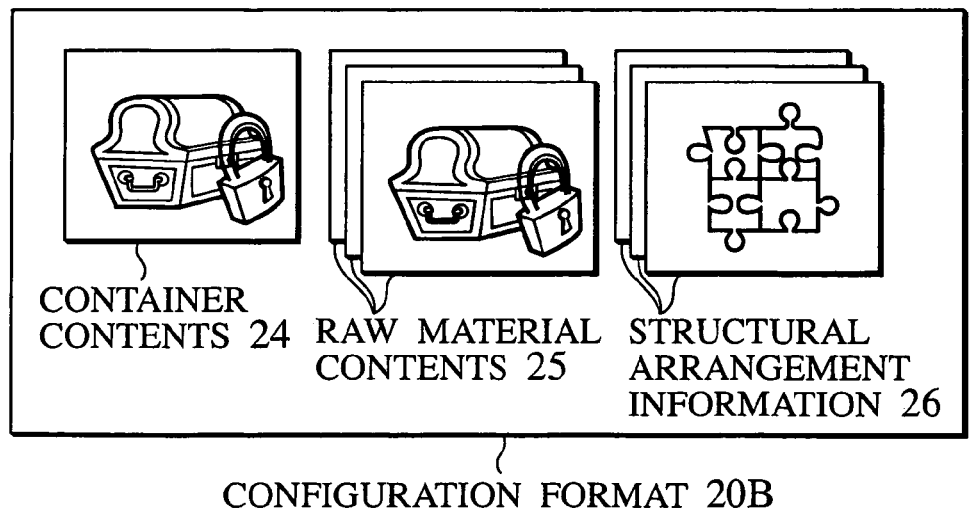

FIG. 2A shows the data structure in the distribution format 20A and FIG. 2B shows the data structure in the configuration format 20B.

As shown in FIG. 2A, data in the "distribution format" comprises a contract state information section 21, a GUID information section 22, and a contents section 23. Among them, the contract state information section 21 is formed by a contracting procedure field 21a and a key field 21c, where the contracting procedure field 21a describes the URL (Uniform Resource Locator) 21b, The URL 21b described in the contracting procedure field 21a is a URL that specifies the contracting processing.

Also, the contents section 23 contains data of the contents themselves in an encrypted form, and the contracting server is to provide a key for decrypting the contents when the URL 21b in the contracting procedure field 21a is executed.

The GUID information section 22 indicates a unique identifier assigned to each contents, which is to be utilized in identifying the contents when the contracting server returns a key. The key provided by the contracting server is written into the key field 21c, and the contents are in the reproducible state whenever the key is written in this key field 21c.

On the other hand, the data structure in the configuration format 20B shown in FIG. 2B comprises a container contents 24, a plurality of raw material contents, and a structural arrangement information 26. Among them, the container contents 24 are contents to be a background into which each raw material contents 25 are to be incorporated. These container contents 24 are stored in the distribution format, and the raw material contents 25 are stored in the data structure of the distribution format or the data structure (secondary product) of the configuration format. Consequently, each contents have a contract term. Also, the structural arrangement information 26 is a structural information indicating how each raw material contents 25 are to be merged with the container contents 24.

Here, the following exemplary key structure can be used.

<Key Structure>

Figure 3:
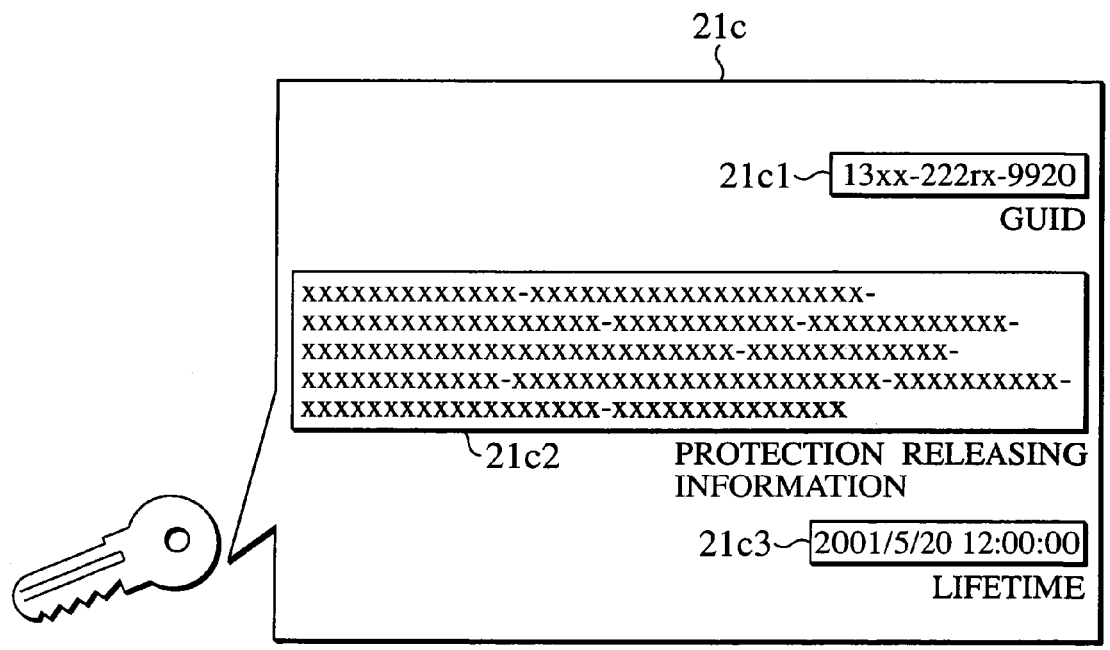
FIG. 3 is a diagram showing an exemplary structure of a key that can be used in the contents distribution system of FIG. 1.

The key structure of the key in the key field 21c is as shown in FIG. 3 which comprises a GUID information 21c1 for indicating the content of the GUID information section 22 of the contents in the distribution format that correspond to this key, a protection releasing information 21c2 which is data for decrypting the contents, and a lifetime information 21c3 for indicating the lifetime (valid period) of this key.

The lifetime information 21c3 is optional and it can be specified by the remaining number of times for which the contents can be reproduced rather than the date and time.

Next, the data structure to be handled in this system will be described.

<Data Structure>

Figure 4:
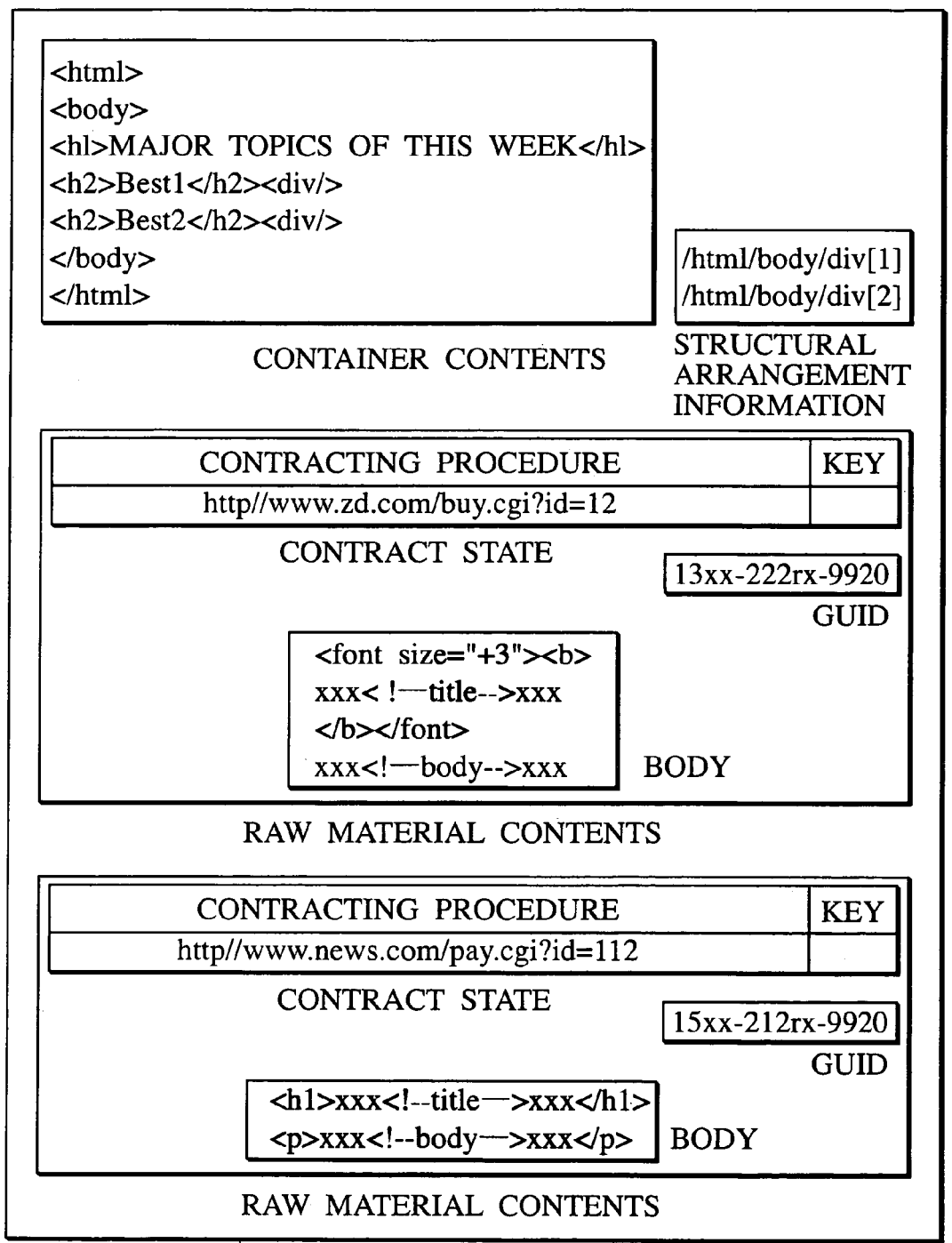
FIG. 4 is a diagram showing an exemplary Web page contents in a configuration format that can be used in the contents distribution system of FIG. 1.

In the case where the contents are a Web page, it is appropriate to use an "Xpath" language as a description of the structural arrangement information 26 mentioned above. FIG. 4 and FIG. 5 respectively show an exemplary data structure in the configuration format and an exemplary data structure in the reproduction format in the case of adopting the "Xpath" as a way of describing the structural arrangement information 26.

FIG. 4 and FIG. 5 show exemplary Web contents of a magazine page formed by gathering two charged news articles, which are described in "Xpath", where FIG. 4 shows the data structure in the configuration formation 20B, and FIG. 5 shows the data structure in the reproduction format 20C.

By converting the exemplary Web contents in the configuration format as shown in FIG. 4 at the recomposer to be described below, it is possible to obtain the exemplary Web contents in the reproduction format as shown in FIG. 5.

Next, the detailed configuration of the contents distribution system in this embodiment will be described with reference to FIG. 1 again.

Figure 6:
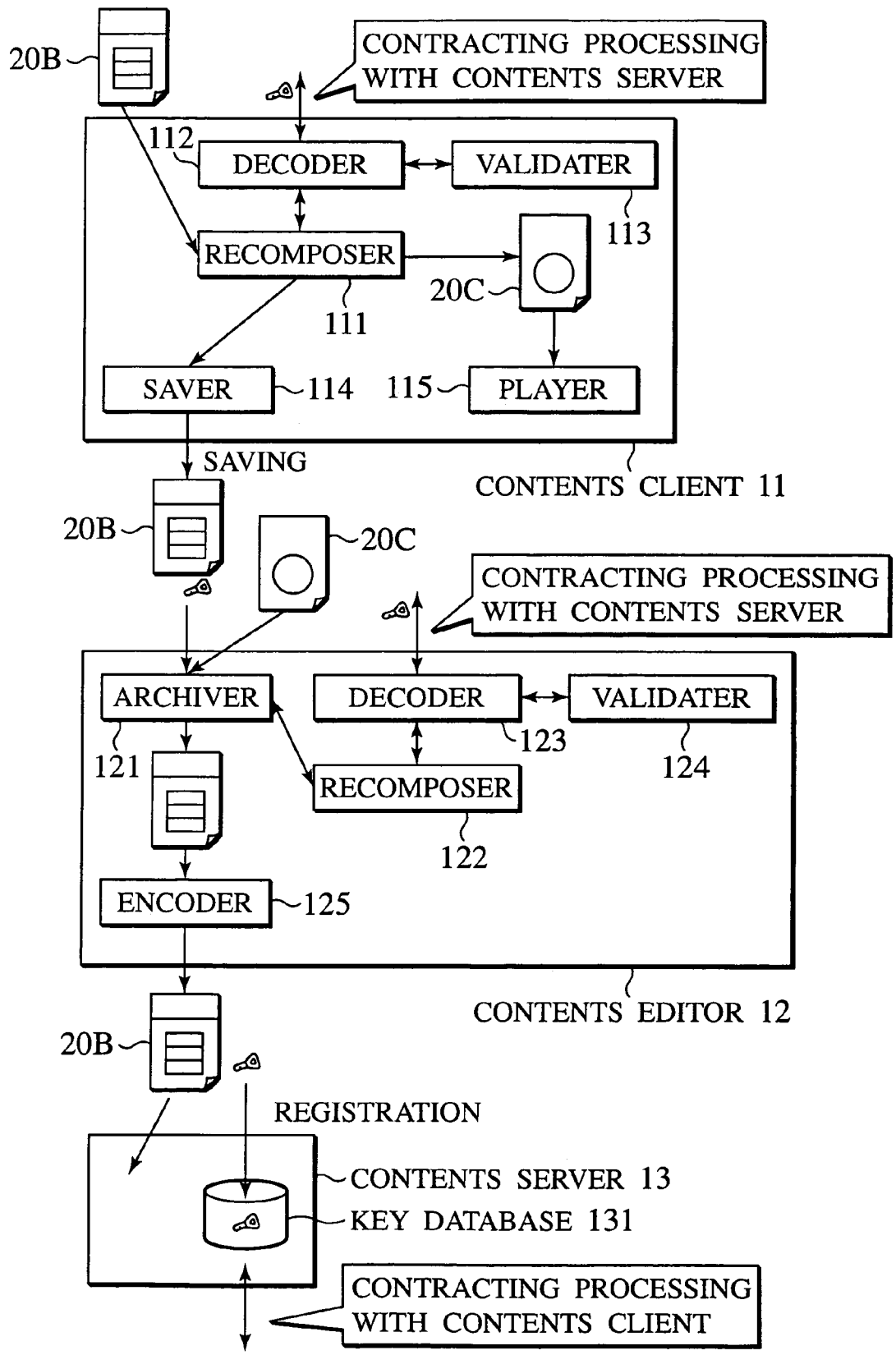
FIG. 6 is a block diagram showing an exemplary detailed configuration of a contents client, a contents editor and a contents server in the contents distribution system of FIG. 1.
Figure 7:
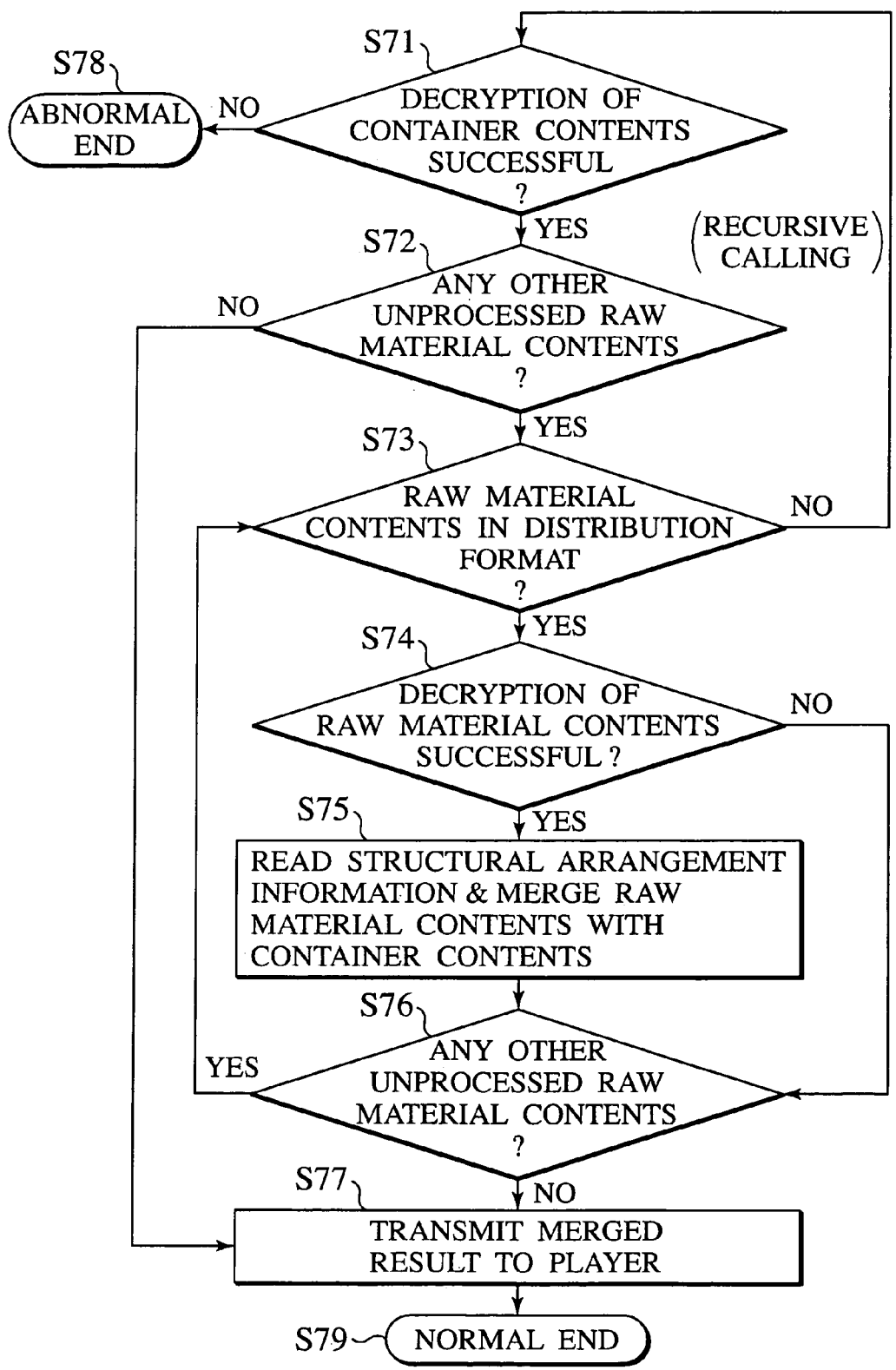
FIG. 7 is a flow chart for a processing algorithm of a recomposer provided in the contents distribution system of FIG. 6.

The contents distribution system 10 of this embodiment comprises the contents client 11, the contents editor 12 and the contents server 13 in the case of the maximal configuration as already mentioned above, and among them, the contents client 11 reads the contents in the configuration format, carries out a necessary contracting processing, and reproduces the contents, and as shown in FIG. 6, this contents client 11 comprises a recomposer 111, a decoder 112, a validater 113, a saver 114 and a player 115.

The recomposer 111 carries out a processing for extracting the container contents and the raw material contents contained in the data in the configuration format 20B read by the contents client 11. The validater 113 checks the validity of the key contained in the target contents in the distribution format, and updates the lifetime or re-acquires the contents according to the need.

The decoder 112 decrypts data in the distribution format among the container contents and the raw material contents extracted by the recomposer 111 into the data in the reproduction format, and also has a function for carrying out the contracting processing with the contents server according to the need at a time of the conversion after checking the validity of the already acquired key by using the validater 113.

The player 115 reproduces the contents in the data structure of the distribution format that are decrypted by the decoder 112. The saver 114 provides a function for saving the contents under the processing by the recomposer 111 into a file system in the configuration format. At this point, if there are decrypted data among the container contents and the raw material contents contained in the contents given from the recomposer 111, the saver 114 saves them after converting them into the original encrypted state. Note however that the saver 114 functions such that the key embedded in the contract state information section 21 will remain in the embedded state and not removed.

The processing of the contents client 11 in such a configuration is as follows. The data in the configuration format 20B (see FIG. 2B) read by the contents client 11 are given to the recomposer 111 first. The recomposer 111 extracts the container contents and the raw material contents contained in the data in the configuration format.

If the extracted data are in the distribution format, the extracted data are given to the decoder 112 where they are decrypted. At this point, the decoder 112 checks the validity of the already acquired key by using the validater 113 and carries out the contracting processing with the contents server according to the need.

If the extracted data are in the configuration format, the data in the configuration format are given to the recomposer 111 itself to carry out the reading processing recursively. The raw material in the decrypted distribution format or the configuration format resulting from these processings are appropriately merged with the container contents according to the structural arrangement information of that raw material. Finally, the contents obtained through these processings are reproduced at the player 115. Also, at the arbitrary processing stage of the recomposer 111, the obtained contents in the configuration format can be stored. Note that it is devised to be impossible to take the contents that are converted into the reproduction format in the contents client 11 to outside the system in order to prevent the illegal act.

<Contents Editor>

Next, the configuration of the contents editor 12 will be described. The contents editor 12 has a function for producing the contents in the data structure of the configuration format, and at a time of producing the contents in the configuration format, the contents editor 12 can incorporate the other contents in the configuration format as the raw materials. As shown in FIG. 6, the contents editor 12 comprises an archiver 121, a recomposer 122, a decoder 123, a validater 124, and an encoder 125.

The archiver 121 makes archives of the contents in the configuration format or the contents in the distribution format that are obtained from the external, by forming a file (library file) by combining a plurality of files.

The recomposer 122 carries out a processing for reading data in the configuration format from the external of the system, merging the raw materials contained in the data into the container contents and putting them into a reproducible state while reading the structural arrangement information.

The decoder 123 has a function for carrying out a series of processing for the given contents in the distribution format, in which the contracting processing is carried out by communicating with the contents server 13. the key is acquired, and the contents are decrypted so as to output the contents in the reproducible state.

The validater 124 checks the validity of the key contained in the target contents in the distribution format and updates the lifetime of the key or re-acquires the contents according to the need.

The encoder 125 carries out the encryption by assigning the charging contract with respect to the container contents contained in the contents in the configuration format formed by the archiver 121. The encoder 125 also carries out a processing for inserting the contents in the distribution format obtained by assigning the contract term to the container contents into the contents in the configuration format, and outputting the resulting contents in the configuration format and the key.

The processing of the contents editor 12 is as follows.

First, the archiver 121 reads one container contents into which zero or more raw material contents are to be incorporated. When there are more than one raw materials, the structural arrangement of each raw material in the container contents is determined according to the operation of the creator entered by an editing tool, and recorded as the structural arrangement information in the configuration format contents. It should be noted here that this editing tool only determines the structural arrangement and does not change the contents themselves (so as to prevent the alteration of the contents by the others).

Then, the container contents in the distribution format obtained by assigning the contract term is inserted into the configuration format contents. The resulting configuration format contents and the key are then outputted.

<Contents Server>

The contents server 13 is a Web server having a function for managing and delivering keys. More specifically, the contents server 13 has a function for carrying out the contracting processing by being connected with the contents client 11, and returning a corresponding key in response when the contract is correctly executed. The contents server 13 may also have an optional function for delivering the contents in the configuration format.

[Content Client Constituent Components Algorithms]

The contents client 11 comprises the recomposer 111, the decoder 112, the validater 113, the saver 114 and the player 115, as shown in FIG. 6. The algorithm for each component constituting the contents client 11 will be described here.

<Recomposer Algorithm>

The recomposer 111 carries out a processing for reading data in the configuration format from the external of the system, merging the raw materials contained in the data into the container contents and putting them into a reproducible state while reading the structural arrangement information. This function can be realized by a procedure of the recomposer algorithm shown in FIG. 7, as follows.

First, at the step S71, the container contents in the distribution format are taken out, and the decryption processing is carried out at the decoder 12 (this decryption processing will be described in the decoder algorithm below). As a result, if the decryption is successful, the processing proceeds to the step S72, whereas if the decryption is failure, the processing proceeds to the step S78 where the processing is terminated in an abnormal state.

At the step S72, whether there is any raw material contents that have not been set as the decryption target or not. If there is, the processing proceeds to the step S73, whereas otherwise the processing skips to the step S77.

At the step S73, one raw material contents that have not been set as the decryption target is taken out, and its data format is checked. As a result, if its data format is the distribution format, the processing proceeds to the step S74, whereas if its data format is the configuration format, this algorithm is called up recursively by using this contents as input.

At the step S74, the decryption processing for the taken out raw material contents is carried out at the decoder 112. As a result, if the decryption is successful, the processing proceeds to the step S75, whereas if the decryption is failure, the processing proceeds to the step S76.

At the step S75, the structural arrangement information for the raw material contents decrypted at the step S74 is read, and the raw material contents are merged with the container contents decrypted at the step S71.

At the step S76, whether there is any raw material contents that have not been set as the decrypted target or not. If there is, the processing returns to the step S73, whereas otherwise the processing proceeds to the step S77.

At the step S77, the contents merged by the above processing are transmitted to the player 115 and the processing proceeds to the step S79 where the processing is terminated in a normal state.

Figure 8:
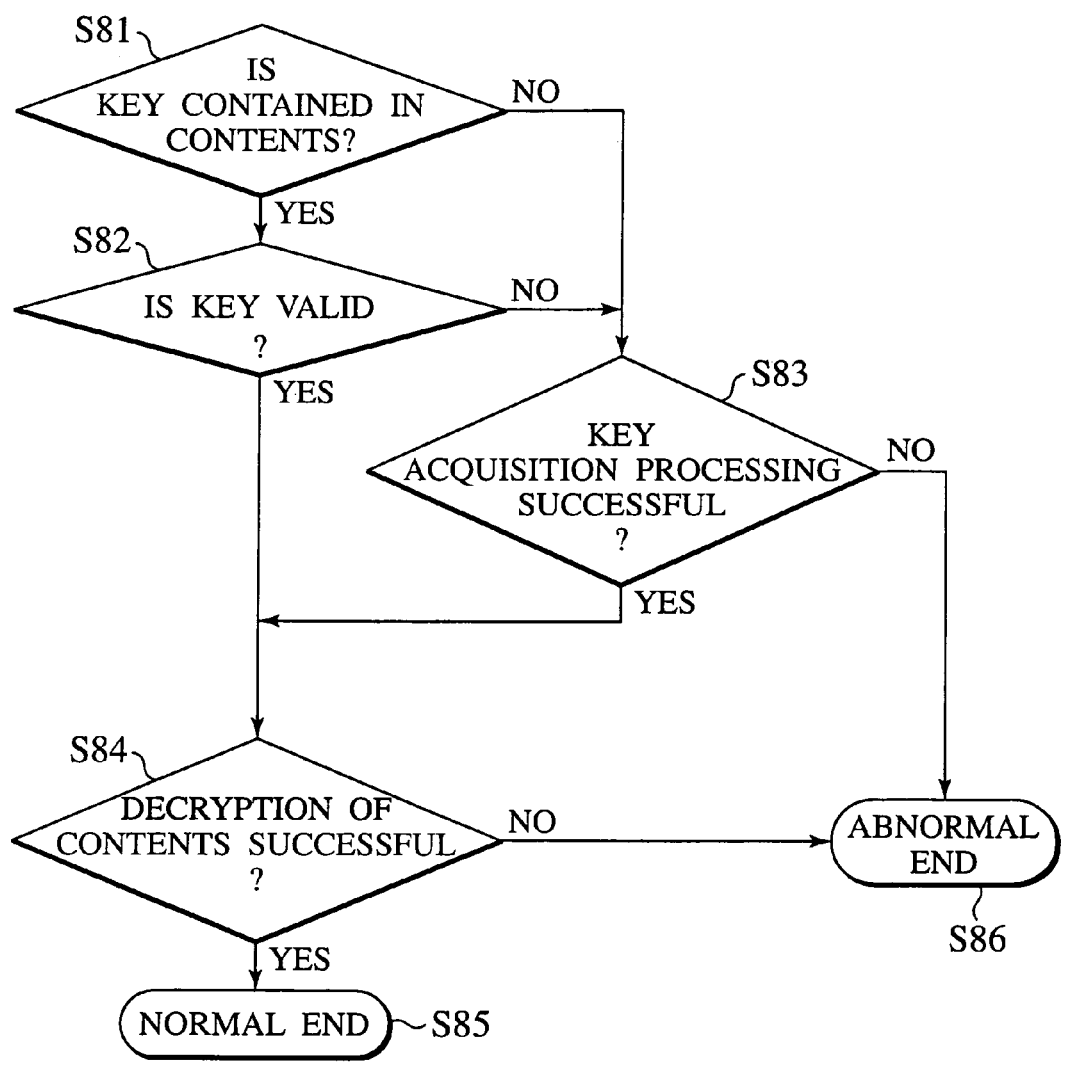
FIG. 8 is a flow chart for a processing algorithm of a decoder provided in the contents distribution system of FIG. 6.

Next, with reference to FIG. 8, the algorithm for realizing the function of the decoder 112 will be described.

<Decoder Algorithm>

The decoder 112 has a function for carrying out a series of processing for the given contents in the distribution format, in which the contracting processing is carried out by communicating with the contents server 13. the key is acquired, and the contents are decrypted so as to output the contents in the reproducible state. This processing is called up as a sub-routine of the processing of the recomposer algorithm shown in FIG. 7.

This decoder algorithm will now be described with reference to FIG. 8. Note however that the key validity verification will be described separately in the validater algorithm shown in FIG. 9 below. Also, the exchange for the contracting procedure with the contents server 13 will be described separately in the key acquisition algorithm shown in FIG. 10 below.

First, at the step S81, the key field in the contrast state 21 of FIG. 2 is checked and whether the key is already contained in the data or not is judged. As a result, if the key is contained, the processing proceeds to the step S82, whereas if the key is not contained, the processing proceeds to the step S83.

At the step S82, whether the key is valid or not is judged by using the validater. As a result, if the key is valid, the processing proceeds to the step S84, whereas if the key is invalid, the processing proceeds to the step S83.

At the step S83, the key acquisition processing is carried out by communicating with the contents server 13 (this key acquisition processing will be described in the key acquisition algorithm below). Then, if the key acquisition is successful, the processing proceeds to the step S84, whereas if the key acquisition is failure, the processing proceeds to the step S86 where the processing is terminal in an abnormal state.

At the step S84, the decryption of the contents using the acquired by the above processing is attempted. Then, if the decryption is successful, the processing proceeds to the step S85 where the processing is terminated in a normal state, whereas if the decryption is failure, the processing proceeds to the step S86 where the processing is terminal in an abnormal state.

Figure 9:
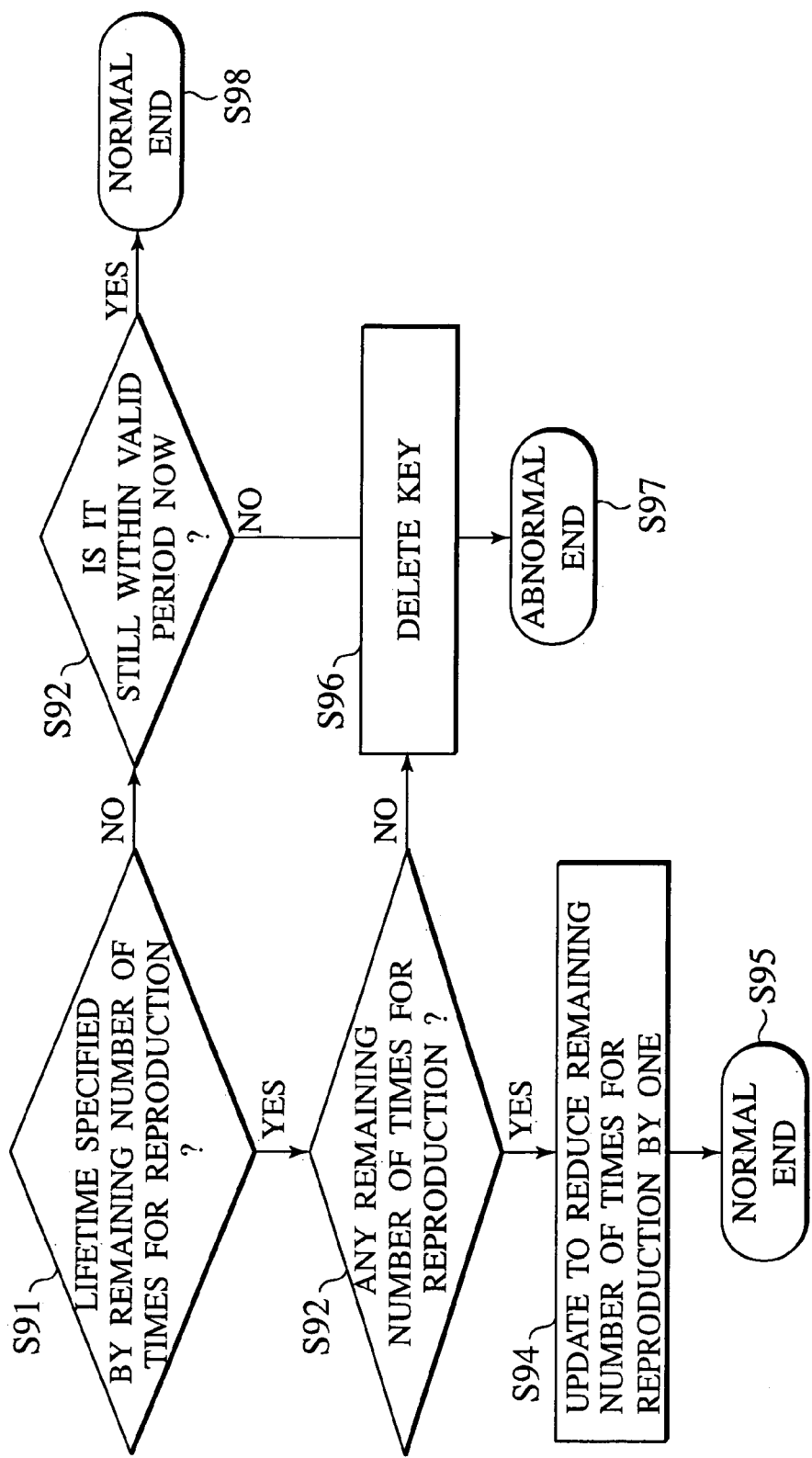
FIG. 9 is a flow chart for a processing algorithm of a validater provided in the contents distribution system of FIG. 6.

Next, the algorithm for realizing the function of the validater 113 will be described with reference to FIG. 9.

<Validater Algorithm>

The validater 113 checks the validity of the key contained in the target contents in the distribution format and updates the lifetime of the key or re-acquires the contents according to the need. This processing is called up as a sub-routine in the processing of the decoder algorithm shown in FIG. 8, and returns the check result regarding the key validity, according to FIG. 9 as follows.

First, at the step S91, the lifetime specifying format recorded in the key is checked. As a result, if the specifying format is date and time, the processing proceeds to the step S92, whereas if the specifying format is the remaining number of times for reproduction, the processing proceeds to the step S93.

At the step S92, whether it is still within the valid period of the specified lifetime now or not is checked. As a result, if it is within the valid period, the processing proceeds to the step S98 where the processing is terminated in a normal state for indicating that the key is valid, whereas if it is not within the valid period, the processing proceeds to the step S96.

At the step S93, whether there is any remaining number of times for reproduction or not is checked. As a result, if there is, the processing proceeds to the step S94, whereas otherwise the processing proceeds to the step S96.

At the step S94, the lifetime recorded in the key is updated by reducing the remaining number of times for reproduction by one, and the processing proceeds to the step S95 where the processing is terminated in a normal state for indicating that the key is valid.

At the step S96, the key is deleted, and the processing proceeds to the step S97 where the processing is terminated in an abnormal state for indicating that the key is invalid.

Figure 10:
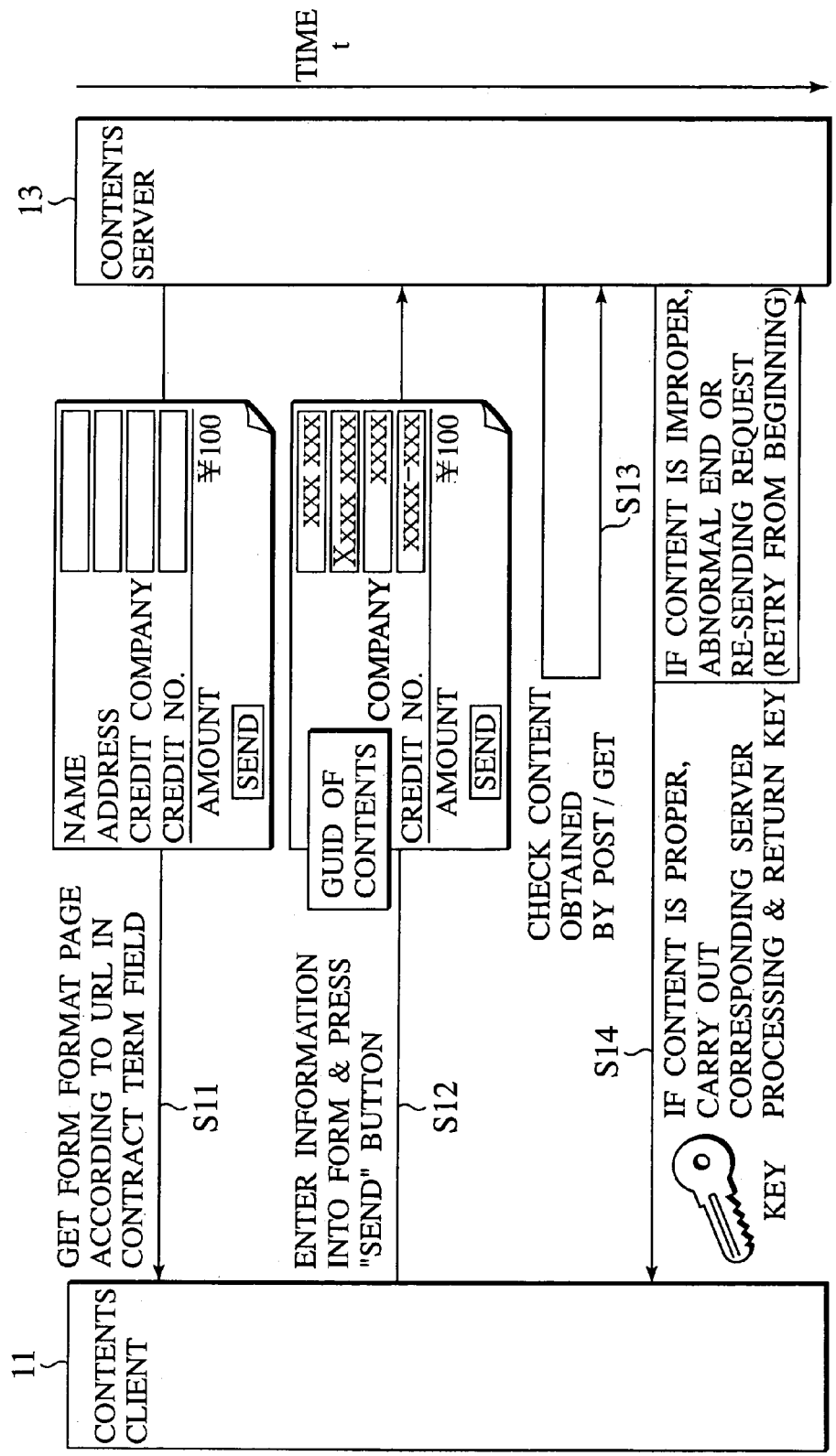
FIG. 10 is a flow chart for a key acquisition algorithm of a decoder provided in the contents distribution system of FIG. 6.
Figure 11:
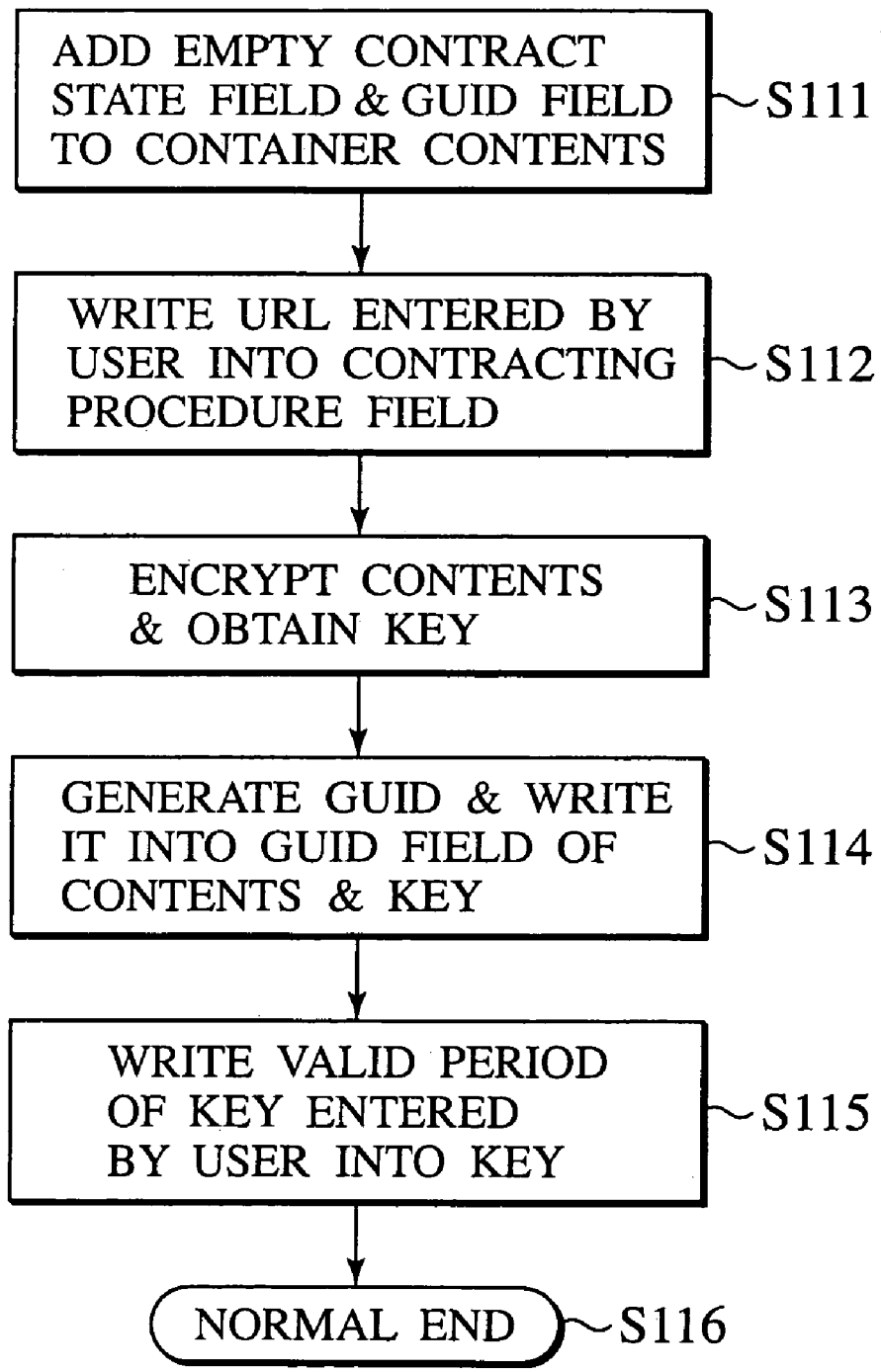
FIG. 11 is a flow chart for a processing algorithm of an encoder provided in the contents distribution system of FIG. 6.

Next, the algorithm for realizing the function of the key acquisition will be described with reference to FIG. 10. The key acquisition algorithm by the decoder is as follows.

<Key Acquisition Algorithm>

The decoder 112 that is a constituent element of the contents client 11 will attempt the key acquisition by communicating with the contents server 13 when the valid key is not contained in the processing target contents. This processing is called up as a sub-routine in the processing of the decoder algorithm shown in FIG. 8.

This processing is basically the same as the typical processing of CGI or the like and there is nothing special, but it is characterized in that the contents server returns a key instead of returning a Web page when the server processing is correctly executed.

In the following the acquisition algorithm will be described with reference to FIG. 10. Note that it is preferable to introduce the security technique for preventing the eavesdropping, for example, in this processing, but this can be done by using the well known method such as SSL (Secure Sockets Layer: a technique for protecting the security of data to be exchanged between a WWW browser and a WWW server) so that this aspect will not be described here.

First, at the step S11, the decoder 112 acquires a Web page in the contract describing form format from the contents server 13 according to the URL in the contract term of the target contents.

Next, at the step S12, the decoder 112 pops up a dialog box for displaying the acquired form page. Then, the end-user enters necessary items into the displayed contract page and clicks the GUI portion on the Web page that has a function for sending that information. As a result, the various information regarding the contract is transmitted from the decoder 112 to the contents server 13. This information includes the GUID information of the target contents.

Next, at the step S13, the contents server 13 analyzes the contract information from the decoder 112 and checks its validity.

Next, at the step S14, if the contract information is valid, the contents server 13 carries out the contracting processing (such as the charging processing, for example), returns the corresponding key to the decoder 112, and terminates the processing in a normal state. Note that the corresponding key is identified by searching through a key database 131 of FIG. 6 provided inside the contents server 13, according to the GUID information of the contents that is sent from the decoder 112 at the step S12. If the corresponding key cannot be found or the contract information is not valid, the error code is transmitted to the decoder 112 and the processing is terminated in an abnormal state.

<Player>

The player 115 which is a constituent element of the contents client 11 is a dedicated reproduction unit of this system. In the contents client 11 of this system, in order to prevent the leakage of the contents in the decrypted state, the decrypted contents can be given only to this built-in player 115 at a time of reproducing the decrypted contents, and no external application will be used.

The player 115 receives the contents converted in the reproduction format by the decoder 112, and reproduces that contents. Depending on contents, there can be various players such as that for displaying Web pages, that for playing music, that for displaying images, etc.

Optionally, it is also possible to make this player 115 such that, even when the contents given from the decoder 112 contains non-decrypted raw materials, the player 115 makes the best effort to reproduce the remaining portions as much as possible while not reproducing these non-decrypted raw materials only. For example, when the contents is a Web page, the place holders can be arranged for the non-decrypted raw material portions, and the remaining portions can be displayed.

In this way, this system uses a mechanism by which the contents reproduction is possible only by the built-in player 115.

One of the features of the present invention is the use of a configuration in which the contents reproduction is possible only by the built-in player 115 in order to surely prevent the leakage of the contents in the decrypted state. Namely, in this system, the reproduction of the decrypted contents is possible by giving the decrypted contents only to this built-in player 115 without utilizing any external application. This is a mechanism for preventing the leakage of the contents to the external application.

Next, the saver 114 will be described.

<Saver>

The saver 114 which is a constituent element of the contents client 11 provides a function for saving the contents under the processing by the recomposer 111 into a file system in the configuration format. At this point, if there are decrypted data among the container contents and the raw material contents contained in the contents given from the recomposer 111, the saver 114 saves them after converting them into the original encrypted state. Note however that the saver 114 functions such that the key embedded in the contract state will remain in the embedded state and not removed.

In this way, a mechanism by which the contents saved on the file system cannot be viewed from the other applications is realized, and it is possible to realize a function for resuming the contracting processing from a middle when the contents client 11 is read next time, because the key is remaining inside.

<Contents Editor>

The contents editor 12 has the archiver 121 and the encoder 125 as shown in FIG. 6. The algorithm for each of these components will be described here.

<Archiver>

The archiver 121 in the contents editor 12 provides the editing function for inserting the raw material contents into the contents. Note however that the contents that can be used as the container contents are limited to those in the reproduction format. On the other hand, the raw material contents are allowed to have the data structure of either the reproduction format or the configuration format.

In the case where the data structure is the reproduction format, the contents are merged at positions in the container contents as specified by the editing operation, whereas in the case where the data structure is the configuration format, the structural arrangement information is generated instead of merging the contents. Also, at a time of the editing, the raw materials will be reproduced, so that the raw material contents in the configuration format will be decrypted at a time of reading.

This decryption processing is carried out by the recomposer 122, the decoder 123 and the validater 124, using the same method as the algorithm described for the contents client 11.

When the editing operation is eventually finished, the archiver 121 produces the structural arrangement information of each raw material contents within the container contents according to the editing result, and produces one configuration format contents combining the container contents and the raw material contents. At this point, the keys contained in the raw material contents are all removed.

<Encoder>

The encoder 125 in the contents editor 12 applies the encryption by assigning the charging contract to the container contents contained in the contents in the configuration format produced by the archiver 121. This function is realized by the algorithm shown in FIG. 11 as follows.

namely, the encoder 125 first executes the processing of the step S111 where the empty contract state field and GUID field are added to the container contents to put it formally into the distribution format.

Next, at the step S112, the URL corresponding to the contracting processing is entered by the user, and this URL is written into the contracting procedure field 21a of FIG. 2. Here, however, the URL will not be written in the case where the contract is not required.

Next, at the step S113, when the URL of the contracting procedure is given at the step S112, the contents is encrypted and the key is obtained.

Next, at the step S114, GUID is generated and written into the GUID fields of the contents and the key. Here, any one of the well known methods can be used for the GUID generation algorithm.

Next, at the step S115, the lifetime of the key is entered by the user, and its value is written into the lifetime field 21c3 of FIG. 3.

<Contents Server>

The contents server 13 carries out the contracting processing with the decoder 112 of the contents client 11 as described with reference to FIG. 10, and the processing for returning a key in response. In order to realize this function, the contents server 13 is implemented in a form of a Web server, and the key database 131 of FIG. 6 is provided inside. Optionally, the contents server 13 may be capable of transmitting the contents in response to a request.

The contents distribution system of this embodiment in the above described configuration is a middleware related to the network that is aimed at executing contracts and exchanging contents through HTTP.

In this contents distribution system, the conventional charging processing system is expanded to be able to handle a new data format called "configuration format" in addition to the conventionally used data formats called "reproduction format" and "distribution format". Also, in the system configuration, two devices (functional components) called "archiver" and "recomposer" are added to the conventional charging processing system. These two devices (functional components) are made to function in cooperation with the "decoder" and the "encoder" of the conventional charging processing system. Note that the decoder is a device for reading data in the distribution format and converting it into the reproduction format, and the encoder is a device for producing data in the distribution format from the ordinary reproducible contents.

The configuration format employed in the present invention is a data format for expressing the composite contents which are formed from a plurality of charged genuine contents, which is the data structure to be used at a time of distribution, that is, the data structure of the contents to be utilized by the end-user.

More specifically, the data in the configuration format comprises the following three elements:

(1) the genuine contents in the distribution format which are to be used as raw materials;

(2) the container contents in the distribution format for putting these genuine contents together; and (3) a list of the structural arrangement information for each raw material contents within the container contents.

In this configuration format, each raw material contents in the distribution format in a state by which they are acquired and their construction method are maintained separately, rather than mixing these raw materials into one contents, and the end-user cannot use each raw material unless the end-user purchases each raw material.

Note that the structural arrangement information can be given in various forms depending on the target media types. For example, when the product is a 3D computer graphics work, the structural arrangement information can be given by coordinates, direction, etc. in the three dimensional space of model parts to be used as the raw materials. Also, when the product is a Web page, the structural arrangement information can be given by information as to whether the raw material page is to be inserted into a tag such as a container page, for example.

The recomposer 111 is a device for interpreting the data in the configuration format and reconstructing it in a reproducible state, which is used in the preliminary processing for making the contents utilizable at the contents client 11 that is a device to be used by the end-user. The recomposer 111 sequentially enters the raw materials in the distribution format that are contained in the data in the configuration format into the decoder 112 to have them decrypted. In this process, the contracting procedure regarding the contents utilization is carried out, and the fee for each raw material is paid to the raw material provider. The raw material that is successfully decrypted is then appropriately merged with the container contents according to the structural arrangement information for that raw material. Finally, the contents in which all the raw materials that are successfully decrypted are merged with the container contents is given to the reproduction device.

By using such a mechanism, when the end-user purchases the secondary product contents, the contracting processing with respect to each one of the copyright holders related to the raw materials and the secondary product will be carried out by the end-user.

On the other hand, the archiver 121 is a device for generating the contents in the configuration format, which is used in the contents editor 12 that is a device of the secondary product creator. The archiver 121 reads the raw materials in the distribution format specified by the secondary product creator, and adds them to the configuration format contents, or determined the structural arrangement of each raw material within the container contents and records the structural arrangement information in the configuration format contents according to the operation of the secondary product creator.

The basic functions can be realized by the configuration described above, but it is still preferable to be able to incorporate not only the genuine contents but also the composite contents as the raw materials. When the contents to be used as the raw materials are limited to the genuine contents, it implies that only a single stage of the re-use of contents as the raw material is allowed. In contrast, when it is made possible to incorporate not only the genuine contents but also the composite contents as the raw materials of the composite contents, it becomes possible to continue the contents re-use chain indefinitely in principle.

With this extension, it is possible to expect the effect of promoting the contents re-use further. Note however that the execution of the charging contract with respect to each raw material provider must be guaranteed even in this extension.

In order to realize this extension, there is a need to extend the configuration format such that not only the distribution format but also the configuration format can be used as the data format of the raw materials to be incorporated into the composite contents, and to extend the function of the recomposer such that the recomposer can read data in that extended configuration format, incorporate them as the raw materials into the composite contents, and properly execute the charging processing of the license type with respect to such composite contents.

As for the extension of the configuration format, it can be realized by providing a list of "each raw material in the distribution format or the configuration format" instead of a list of "each raw material in the distribution format".

The extension of the recomposer can be realized as follows. In the process for sequentially decrypting the raw materials contained in the processing target composite contents, the recomposer can be made to function such that each extracted raw material in the distribution format will be sent to the decoder for decrypting it similarly as in the above but each extracted raw material in the configuration format will be recursively processed by the recomposer itself. Namely, the recomposer interrupts the current processing once, initializes the internal state, and converts the contents in the reproduction format obtained by executing the decryption processing and the constructing processing on the raw material in the configuration format, back to its initial processing state. By this processing, all the raw materials contained in the entered composite contents will be decrypted after the charging processing is carried out and then they are re-constructed in the reproducible state.

Also, when the CDL is introduced, it becomes possible for the contents client 11 to ascertain the fee or items of each contract, so that it becomes possible to provide an assistance regarding the payments such as reminding the current payment amount to the end-user, automatically writing items necessary for making the contract, etc. These functions will be referred to as the user agent functions.

In the following, the extended CDL decoder and CDL contents server to be used in the contents charging system using CDL will be described.

<Contract Definition Language (CDL)>

First, the contract definition language (CDL) will be described. Note that the CDL is only an example, but the language having the equivalent defining function is necessary in order to realize the contents charging system, although the grammar can be different.

FIGS. 12A and 12B shows two exemplary contracts written in the CDL. FIG. 12A is an exemplary description for the case where the commercial use will be charged but the non-commercial use is free, and FIG. 12B is an exemplary description for the case where the secondary product creator pays all the raw material fees of the composite contents.

As shown in FIGS. 12A and 12B, in the CDL, the contract is defined between brackets of a form "contract{ }". The contract comprises "profile{ }", "requirements{ }" and "action{ }", which respectively define the profile of the contract, the items required for the contract execution, and the side effect action.

In the profile of the contract, "price", "URL of a server for executing the contract (processor)", "URL for a screen design to be used at a time of entering the contract items (style)", and "corresponding card company name (card-company)" must be defined. However, if the price is \0, there is no need to define the others.

The items required for the contract execution can include:
"client's name (client-name)"
"client's address (client-address)"
"client's telephone number (client-phone no)"
card company to be used for payment (card-company)"
card number (card-account)" as well as
"actual payer's name (carduser-name)"

payer's address (carduser-address)"

payer's telephone number (carduser-phone no)"

in anticipation of the cases where a person different from the client will be pay for the client.

Note that these items are not indispensable and the actual items to be required can be selected from them. Also, the default value can be defined for each item after "=" symbol. In the example of FIG. 12A, the default values of the payer's name, address and telephone number are set to be the client's name, address and telephone number.

The side effect action can be described as a procedure. As a type of action that can be executed, only "contract execution" is provided in this example. The contract execution is described as a method, in such a form as "executing party, contract ID (argument list)". The contract object can be described as "CI object name [contract number]". The executing party is specified by using the contract object. An owner of the specified contract object will be the executing party. This can be omitted.

Also, the contracts for different contents contained in the composite contents can be specified by using the following contract objects.

"container[n]"

"containee[n]"

Here, "container[n]" indicates the contract for the container contents into which the contract assigned contents is to be incorporated. The composite contents can be recursively incorporated into another composite contents, and its nest level is specified by the affix [n].

Also, "containee[n]" indicates the contract for the n-th lower level raw material incorporated in this contents itself, where n is a positive integer. This "n" becomes arbitrary when "?" is specified for "n". For example, when it is desired to specify the arbitrary contracts of the raw materials directly contained in this contents itself, "containee[1] [?]" can be used.

The argument list is a list of arguments representing items required for the contract, which are partitioned by commas. Each argument is described as "item name=value". For example, in the case of executing the arbitrary contracts of the raw materials directly contained in this contents itself by specifying the client's name, address, and telephone number, the argument list becomes as follows.

containee[1][?](client-name="Shin-ichiro Hamada",
    client-address="XXXXX", client-phone
    no="XXX-XXX-XXXX")

Finally, the multi-valued definition and the value transfer for the pattern matching will be described. The pattern is described as an argument of "when". Note that "otherwise" matches in the context that does not match with all "when" clauses. Targets of comparison that can be described are the contract objects and the reserving predicate.

As the reserving predicate, "charging" is provided for indicating the act of charging. As the comparison operator, is provided, which becomes true when both sides coincide. Also, wildcards "?" and "*" that indicate arbitrary are provided, where "?" indicates one that makes the condition true and "*" indicates all that make the condition true. Also, the description "[ ]" following the object indicates the constraint condition with respect to that object.

Also, "% n" (where n is a positive integer) has the same meaning as "?" but it can be referred to in a block within "when". Also, "%n*" (where n is a positive integer" has the same meaning as "*" but it can be referred to in a block within "when".

In the example shown in FIG. 12B, it is defined that all the charging contracts among the contents contained in this contents itself are matched with "%1*", and the contract execution is carried out for these contracts. The interpretation of this multi-valued definition is made prior to the contract execution described in the CDL.

The linguistic features of the CDL are briefly described above. Next, the examples of the CDL shown in FIGS. 12A and 12B will be explained.

In the example shown in FIG. 12A, the contract is defined by multiple definitions. One definition is applied in the case where any of the contracts for the contents into which this contents itself is to be incorporated is charging. Among the items listed as the required items, the payer's name, address and telephone number have the default values given so that they do not appear on an input screen of the end-user, but they can be specified by the other contracts as an action. The second definition is applied to all the other cases. No charging is involved so that there are no input items.

The example shown in FIG. 12B is aimed at unifying the user payments, and the action is defined by conditions. The action given there matches in the case where any of the contracts for the contents incorporated into this contents itself is charging, and defines that the creator of this contents itself pays for them. As the required items of this contract, the client information entered with respect to this contents itself is given as it is, and the own credit information is given in relation to the payment. By setting the executing party of this action as "container", the raw material provider can receive the rental fee from the secondary product creator.

<Data Structure in the Distribution Format Using CDL>

Figure 13:
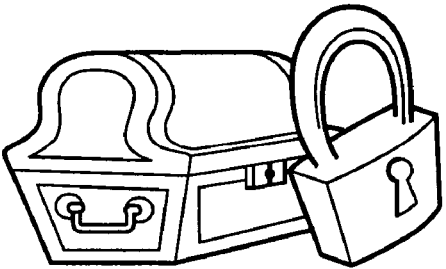
FIG. 13 is a diagram showing an exemplary data in a distribution format using a contract definition language (CDL) that can be used in the contents distribution system of FIG. 1 and FIG. 6.

In the contents charging system, the CDL is used for the "contracting procedure" instead of the URL as in the data structure in the distribution format using CDL shown in FIG. 13. The other features of FIG. 13 are the same as those of FIG. 2A.

<CDL Contents Server>

The CDL contents server 13 can have the same mechanism as the provider side contract interpreter in the contents distribution system. However, the following point must be accounted.

Namely, the style of the Web page for entering the contract items is to be provided in the XSL format. The decoder generates XML according to the items required for the contract defined in the CDL, and XSL for displaying that XML is to be downloaded from the contents server.

<CDL Decoder>

Figure 14:
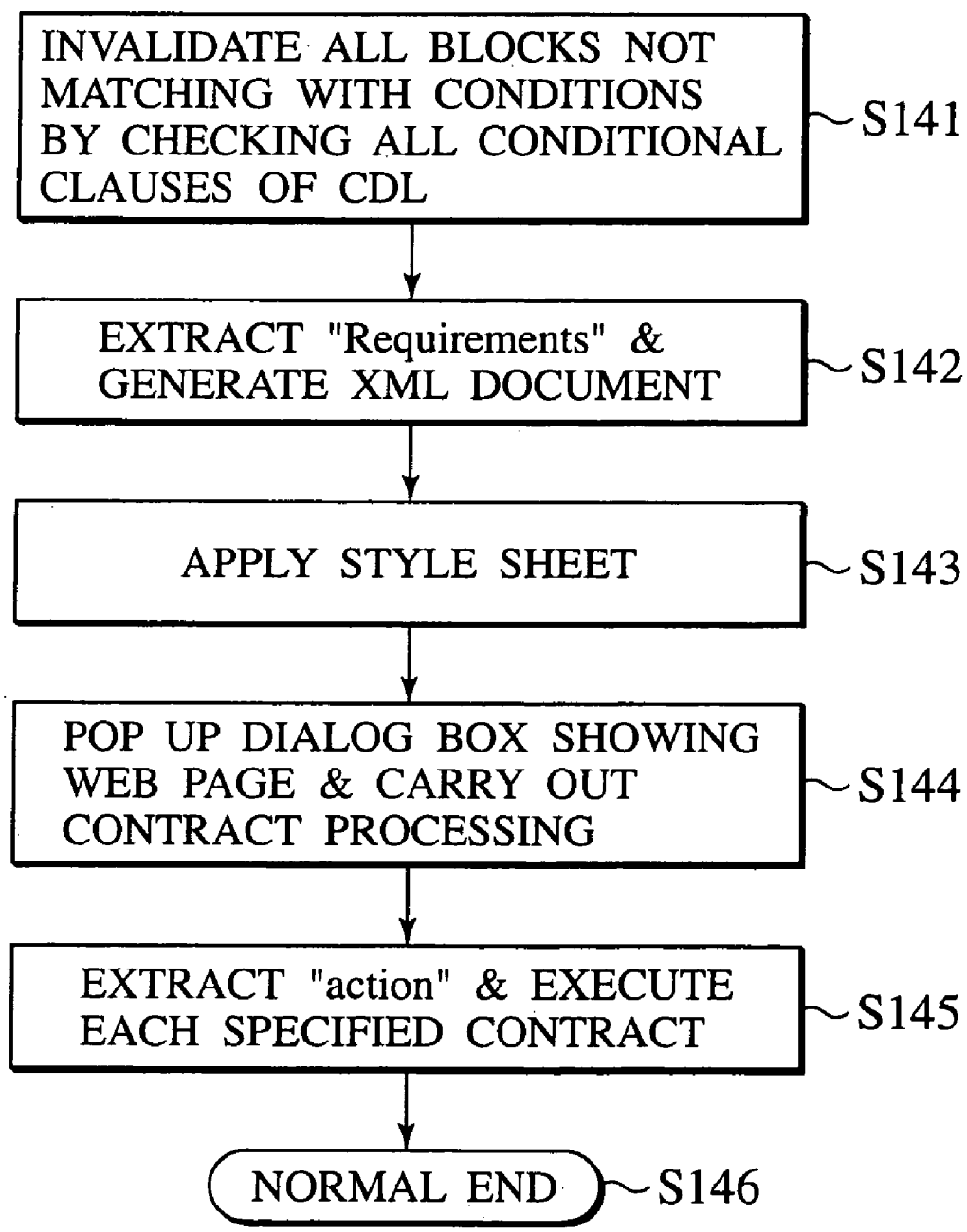
FIG. 14 is a flow chart for a language processing and contract execution algorithm by a CDL decoder that can be provided in the contents distribution system of FIG. 1 and FIG. 6.

The CDL decoder 123 executes the contract by interpreting the CDL. The algorithm for the language processing and the contract execution by the CDL decoder 123 is as shown in FIG. 14.

At the step S141, all the conditional clauses (when) of the CDL are checked and all the blocks that do not match the conditions are invalidated.

Next, at the step S142, the "requirements" of the CDL are extracted and an XML (Extensible Markup Language) document is generated. At this point, each item name is used as an element name in the XML, and each item value is used as an element value in the XML. The item values are empty at this point.

Next, at the step S143, the style sheet is extracted from the style item in the profile of the CDL and applied to the generated XML document.

Then, at the step S144, the dialog box for displaying the applied Web page is popped up to urge the contracting processing to the user. This contracting processing is carried out by the same algorithm as that of the key acquisition described with reference to FIG. 10.

Then, at the step S145, the "action" is extracted and executed. The contract that is a target of the "action" and its parameters are identified, and POST or GET is carried out with respect to the contents server without urging any input to the user.

<User Agent>

Besides these, the exemplary extension as the user agent can be made as follows.

The first function to be provided as the user agent is a "total amount estimation function". This function reads all the CDL descriptions contained in the contents, calculates a total amount in advance, and notified the total amount to the user. With this function, the user can judge whether or not to purchase that contents after learning its price.

The second function to be provided as the user agent is a "user wallet management function", This function stores the paid amount whenever the purchase is made, and presents how much the user has paid up to that point, to the user.

The third function to be provided as the user agent is a "user input assisting function". This function stores the profile of the user and automatically fills the items required in the "requirements" at a time of executing the contract, As a result, in the popped up contract page in the form format, the items such as user's name, user's address, user's telephone number, credit company name, and credit card number are already filled from the beginning, so that the contract page is in a state where it suffices to just press a "send" button.

As described above, the present invention proposes a contents utilization scheme called "copyright rental use scheme" in which the economical burden on the users at a time of utilizing contents can be reduced to a reasonable level, and appropriate fees can be collected for the copyrights of the contents created and provided at each stage by the raw material creators and the secondary product creators, as well as a charging system for carrying out the charging processing as a support to the contents utilization in the copyright rental use scheme.

The copyright rental use scheme is a contents utilization scheme in which "the secondary product creator transfers the payment for the raw material utilization right to the end-user of the secondary product". In short, this is a business model in which it is the end-user, not the secondary product creator, who eventually purchases the raw material contents, and the secondary product creator can creates the secondary product contents by incorporating the raw material contents for free, and sell the secondary product contents. This is a business model in which the end-user of the secondary product contents pays respective utilization fees (the secondary product fee and the raw material fee) to the secondary product creator and each raw material provider at a time of the purchasing the secondary product contents.

In the case of adopting the copyright rental use scheme, it is the end-user of the contents who purchases the raw materials. There are far greater number of end-users of the contents compared with the secondary product creators, so that there is an advantage that the raw material provider can suppress the raw material sales price low. On the other hand, it is possible to expect a synergy effect that the secondary product creator can utilize the raw materials without any initial investment so that the factor for preventing the active utilization of the raw materials disappears. In the conventional contents utilization model using the buy up scheme, there is a need to compare the initial investment required for the raw materials with the effort required for the creation plus the sales of the created product, which could be a factor for preventing the raw material utilization. For these two reasons, the contents utilization business model using the copyright rental use scheme can be a very effective model for the contents raw material sales business.

No such business model has been known in the real world. One of the possible reasons for explaining this fact is that, even if such a business model is contemplated in the real word, there is no reasonable way for the raw material provider to surely collect the raw material fee from the end-user. Another possible reason is that, in the copyright rental use scheme, the end-user who is a customer must pay respective utilization fees to a plurality of copyright holders and this will increase the burden of the end-user in a form of time and effort required for the payments, so that it is not easily acceptable as a sales style. However, in the present invention system, the former problem is resolved by theoretically guaranteeing the accurate monitoring of all the transaction acts, and the latter problem is resolved by providing an operation assistant mechanism for unifying the payments.

In the real world, the license type charging model in which each copyright holder receives the income according to the sales of the work such as the royalty with respect to the published work like music CD or book is also often employed. The contents utilization model using the copyright rental use scheme can emulate such a license type charging model as well. For example, in the case of music CD, it is possible to consider the model in which prices for respective raw material contents provided by copyright holders such as a songwriter, a composer, an arranger, and a singer can be set in advance, and the music CD can be regarded as contents constructed from these raw material contents.

Also, in the above, it is assumed that there is no charging between the secondary product creator and the raw material provider, but in practice, there can be cases where the raw material provider wishes to collect some rental fee (corresponding to the neighboring rights) from the secondary product creator depending on the power relationship between the raw material and the secondary product such as a name value difference or a share difference, or conversely there can be cases where it is more appropriate for the raw material provider to pay an advertisement fee to the secondary product creator in a sense that the incorporation of the raw material in the secondary product can promote the sales of the raw material.

In such cases, there is a need to make the monetary transaction between the secondary product creator and the raw material provider possible. As an application of this function, it is also possible to make such a contract that, \100 will be charged if the own contents are incorporated into the other contents as a raw material and the other contents are intended for the purpose of the commercial use, but there is no charge if the other contents are intended for non-commercial use, for example. It is also possible to consider the extension in which it is possible to specify the number of times or the period of time for which the contents can be reproduced by introducing a concept of the lifetime with respect to a contents encryption key.

In this contents distribution system, the conventional charging processing system is expanded to be able to handle a new data format called "configuration format" in addition to the conventionally used data formats called "reproduction format" and "distribution format". Also, in the system configuration, two devices (functional components) called "archiver" and "recomposer" are added to the conventional charging processing system. These two devices (functional components) are made to function in cooperation with the "decoder" and the "encoder" of the conventional charging processing system. Note that the decoder is a device for reading data in the distribution format and converting it into the reproduction format, and the encoder is a device for producing data in the distribution format from the ordinary reproducible contents.

The configuration format is a data format for expressing the composite contents which are formed from a plurality of charged genuine contents, which is to be used at a time of distribution. More specifically, the data in the configuration format comprises the following three elements:

(1) the genuine contents in the distribution format which are to be used as raw materials;

(2) the container contents in the distribution format for putting these genuine contents together; and (3) a list of the structural arrangement information for each raw material contents within the container contents.

In this configuration format, each raw material contents in the distribution format in a state by which they are acquired and their construction method are maintained separately, rather than mixing these raw materials into one contents, and the end-user cannot use each raw material unless the end-user purchases each raw material.

Note that the structural arrangement information can be given in various forms depending on the target media types. For example, when the product is a 3D computer graphics work, the structural arrangement information can be given by coordinates, direction, etc. in the three dimensional space of model parts to be used as the raw materials. Also, when the product is a Web page, the structural arrangement information can be given by information as to whether the raw material page is to be inserted into a tag such as a container page, for example.

The recomposer is a device for interpreting the data in the configuration format and reconstructing it in a reproducible state, which is to be used by the end-user. The recomposer sequentially enters the raw materials in the distribution format that are contained in the data in the configuration format into the decoder to have them decrypted. In this process, the fee for each raw material is paid to the raw material provider. The raw material that is successfully decrypted is then appropriately merged with the container contents according to the structural arrangement information for that raw material. Finally, the contents in which all the raw materials that are successfully decrypted are merged with the container contents is given to the reproduction device.

By using such a mechanism, when the end-user purchases the secondary product contents, the contracting processing with respect to each one of the copyright holders related to the raw materials and the secondary product will be carried out by the end-user.

On the other hand, the archiver is a device for generating the contents in the configuration format, which is to be used by the secondary product creator. The archiver reads the raw materials in the distribution format specified by the secondary product creator, and adds them to the configuration format contents, or determined the structural arrangement of each raw material within the container contents and records the structural arrangement information in the configuration format contents according to the operation of the secondary product creator.

In the present invention, it is also possible to incorporate not only the genuine contents but also the composite contents as the raw materials. When the contents to be used as the raw materials are limited to the genuine contents, it implies that only a single stage of the re-use of contents as the raw material is allowed. In contrast, when it is made possible to incorporate not only the genuine contents but also the composite contents as the raw materials of the composite contents, it becomes possible to continue the contents re-use chain indefinitely in principle. With this extension, it is possible to expect the effect of promoting the contents re-use. Note however that the execution of the charging contract with respect to each raw material provider must be guaranteed even in this extension.

In order to realize this extension, there is a need to extend the configuration format such that not only the distribution format but also the configuration format can be used as the data format of the raw materials to be incorporated into the composite contents, and to extend the function of the recomposer such that the recomposer can read data in that extended configuration format, incorporate them as the raw materials into the composite contents, and properly execute the charging processing of the license type with respect to such composite contents.

In this case, the extension of the configuration format can be realized by providing a list of "each raw material in the distribution format or the configuration format" instead of a list of "each raw material in the distribution format".

The extension necessary in the recomposer can be realized in such a way that, in the process for sequentially decrypting the raw materials contained in the processing target composite contents, the recomposer functions such that each extracted raw material in the distribution format will be sent to the decoder for decrypting it similarly as in the above but each extracted raw material in the configuration format will be recursively processed by the recomposer itself. Namely, the recomposer interrupts the current processing once, initializes the internal state, and converts the contents in the reproduction format obtained by executing the decryption processing and the constructing processing on the raw material in the configuration format, back to its initial processing state. By this processing, all the raw materials contained in the entered composite contents will be decrypted after the charging processing is carried out and then they are re-constructed in the reproducible state.

Also, in the present invention, in order to handle the monetary contract between the secondary product creator and the raw material provider, the contract definition language with the following description functions and a processing system for interpreting and executing this language are provided.

(1) A description for indicating each contract contained in the contents.

(2) A description of properties indicating features of the contract.

(3) A description of conditions regarding the contract.

(4) A description of action such as payment.

Note that, for the properties of the above item (2), there is a need to specify at least a price, a fee payer, a fee receiver, a payment method, and a list of indispensable items to be inquired to the client. The indispensable items to be inquired to the client include name, age, address, e-mail address, card company name, credit number, etc., for example.

The fee payer can be specified by this contract definition language so that it is possible to handle the monetary contract between the secondary product creator and the raw material provider, such as the payment of the rental fee from the secondary product creator to the raw material provider, which can be realized in such a way that the raw material provider specifies the secondary product creator as a payer in the raw material in advance, or conversely the payment of the advertisement fee from the raw material provider to the secondary product creator (which can be handled as a payment of the negative amount, for example).

In addition, in this contract definition language, the multi-valued definition, the re-definition, and the dynamical definition change of the contract terms can be described.

For example, as the re-definition of the contract terms, it is possible to use such a definition that "each raw material fee to be paid by the end-user will be paid by the secondary product creator instead", for example. In the case where many raw materials are used so that even the raw material fees of the composite contents alone become too high, the secondary product creator pays the raw material fees for the end-user and receives an appropriate product fee from the end-user instead of that. In this case, the secondary product creator will have an overall loss (whenever the secondary product is sold), but it is possible to set an appropriate price for the composite contents created by himself. In this case, there is a need to describe "how much should be paid by which payment method with respect to which contract" as the action of the payment instead of the end-user. Which contract can be described by the above item (1) and how much and which method can be described by the above item (4).

As the charging definition of the contract, it is possible to use the selective contract declaration such as "\100 will be charged if the own contents are incorporated into the other contents as a raw material and the other contents are intended for the purpose of the commercial use, but there is no charge if the other contents are intended for non-commercial use", for example. In this case, there is a need for the condition description of "whether the composite contents into which the own contents are incorporated is charged or not", and to this end, the charging for the composite contents can be referred by using the above items (1) and (2), and the condition description for this referring can be made by using the above item (3). Then, it suffices to make the contract definition by using the above item (2) for each condition.

The contract definition language processing system is activated in order to interpret and execute the contract definition language at a time of carrying out the decryption processing at the recomposer. This processing system provides three functions including a filtering function for extracting only the action and the contract that match with the condition description, a checking function for checking whether the extracted contract satisfies the contract conditions, and an executing function for executing the actual payment action.

As described, the system of the present invention adopts the contents utilization model in the copyright rental use scheme. In the case where the copyright rental use scheme is adopted, it is the end-user of the contents who purchases the raw materials. There are far greater number of end-users of the contents compared with the secondary product creators, so that there is an advantage that the raw material provider can suppress the raw material sales price low. On the other hand, the secondary product creator can utilize the raw materials without any initial investment so that the factor for preventing the active utilization of the raw materials disappears.

In the conventional contents utilization model using the buy up scheme which is the most general business style for the contents trades, there is a need to compare the initial investment required for the raw materials with the effort required for the creation plus the sales of the created product, which could be a factor for preventing the raw material utilization. For these two reasons, the contents utilization business model using the copyright rental use scheme can be a very effective model for the contents raw material sales business.

Also, in the case of providing Web pages as the contents, the Web pages are media in which it is easier to combine or process the contents compared with the other contents such as music or paintings. For example, it is possible to consider the case where articles picked up from a news site are provided with the commentaries attached. Consequently, the business method of the present invention can be very effective for the Web page contents market.

Thus, according to the present invention, it is possible to provide a system in which the economical burden of the secondary product creators can be reduced, the burden on the users at a time of utilizing the contents created by the secondary product creators can be reduced to a reasonable level, and the sales volumes can be increased for both the raw material providers and the secondary product creators, such that a remarkable expansion of the business becomes possible.

In the present invention, at a time of selling the contents constructed as a secondary product by incorporating the charged contents as raw materials, each of the raw materials and the secondary product are encrypted, and the contract information for making the utilization contracts with each of the raw material providers and the secondary product creator through a network is attached to each of the raw materials and the secondary product. The encryption key used in the encryption is registered at a server, and delivered to the user who made the utilization contract when the utilization contract is made.

The present invention proposes a mechanism in which, at a time of distributing the secondary product contents newly created by using the charged raw material contents provided by the third parties, the secondary product creator reserves the obligation to pay the raw material contents utilization fees, and the respective contents utilization fees are paid by the user at the final utilization stage (the utilization stage by the end-user). Namely, each of the raw materials and the secondary product are encrypted, and the contract information for making the utilization contracts with each of the raw material providers and the secondary product creator through a network is attached to each of the raw materials and the secondary product. The end-user makes the utilization contract with each of the raw material providers and the secondary product creator through the network by using the contract information. Then, the encryption key used in the encryption is delivered from the server to the end-user. By decrypting each contents by using this encryption key, it becomes possible to utilize the secondary product contents utilizing the raw materials. The utilization contract with each of the raw material providers and the secondary product creator is made through the network so that it is possible to realize a mechanism in which there is no need to pay the raw materials utilization fees at the secondary product creating stage, and all of them can be paid by the end-user.

As a result, the secondary product creator can be released from the economical burden for purchasing the raw materials, and because there are far greater number of end-users compared with the secondary product creators, it becomes possible to provide a system in which the burden on the users at a time of utilizing the contents created by the secondary product creators can be reduced to a reasonable level, and the sales volumes can be increased for both the raw material providers and the secondary product creators, such that a remarkable expansion of the business becomes possible.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the contents client, the contents editor, and the contents server of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A contents distribution system for enabling utilization of a secondary product contents containing one or more raw material contents which are encrypted by using an encryption key and to which an information for a contract procedure to enable utilization of the raw material contents is attached, the contents distribution system comprising:
   a server device configured to maintain the encryption key of the raw material contents; and
   a client device configured to acquire the encryption key of the raw material contents from the server device, decrypt the raw material contents by using the encryption key and enable the utilization of the secondary product contents, by executing the contract procedure according to the information for the contract procedure attached to the raw material contents when the utilization of the secondary product contents is specified;
   wherein the client device dynamically determines a price of each raw material contents constituting the secondary product contents according to prices of other raw material contents constituting the secondary product contents.

2. The contents distribution system of claim 1, wherein the client device executes the contract procedure for each raw material contents specified from the secondary product contents, according to the information for the contract procedure attached to each raw material contents.

3. The contents distribution system of claim 1, wherein the client device executes the contract procedure between an end-user of the secondary product contents and a raw material contents provider of each raw material contents.

4. The contents distribution system of claim 1, further comprising an editor device configured to encrypt the secondary product contents by using a prescribed encryption key, register the prescribed encryption key in the server device, and attaches a prescribed information for a prescribed contract procedure to enable the utilization of the secondary product contents to the secondary product contents.

5. The contents distribution system of claim 4, wherein the client device also executes the prescribed contract procedure for the secondary product contents, according to the prescribed information for the prescribed contract procedure attached to the secondary product contents, when the utilization of the secondary product contents is specified.

6. The contents distribution system of claim 1, wherein the client device enables the utilization of the secondary product contents created by a secondary product creator without paying any raw material fees to raw material providers of the raw material contents, when an end-user of the secondary product contents pays a raw material fee to each raw material provider of each raw material contents upon executing the contract procedure for each raw material contents at the client device.

7. The contents distribution system of claim 1, wherein the information for the contract procedure contains a first optional information for indicating presence/absence of a license of a user, a second information for specifying arrangement/configuration that can reproduce the secondary product contents, and a third optional information for describing conditions regarding a contract; and
   the client device enables the utilization of the secondary product contents to the user indicated by the first optional information by a utilization method according to the second information, if the license of the user is present when the first optional information is contained and if the conditions regarding the contract are satisfied when the third optional information is contained.

8. The contents distribution system of claim 7, wherein the third optional information indicates a charging method.

9. The contents distribution system of claim 8, wherein the first optional information also indicates a limitation on a valid period.

10. The contents distribution system of claim 8, wherein the first optional information also indicates a limitation on a number of times for reproduction.

11. An information processing device for enabling utilization of a secondary product contents containing one or more raw material contents which are encrypted by using an encryption key and to which an information for a contract procedure to enable utilization of the raw material contents is attached, the information processing device comprising:
   an execution unit configured to execute the contract procedure according to the information for the contract procedure attached to the raw material contents when the utilization of the secondary product contents is specified; and
   a processing unit configured to acquire the encryption key of the raw material contents from a server that maintains the encryption key of the raw material contents, decrypt the raw material contents by using the encryption key and enable the utilization of the secondary product contents when the contract procedure is executed by the execution unit;
   wherein the execution unit dynamically determines a price of each raw material contents constituting the secondary product contents according to prices of other raw material contents constituting the secondary product contents.

12. The information processing device of claim 11, wherein the execution unit executes the contract procedure for each raw material contents specified from the secondary product contents, according to the information for the contract procedure attached to each raw material contents.

13. The information processing device of claim 11, wherein the execution unit executes the contract procedure between an end-user of the secondary product contents and a raw material contents provider of each raw material contents.

14. The information processing device of claim 11, wherein the processing unit enables the utilization of the secondary product contents which is encrypted by using a prescribed encryption key, the prescribed encryption key being registered in the server device, and a prescribed information for a prescribed contract procedure to enable the utilization of the secondary product contents being attached to the secondary product contents.

15. The information processing device of claim 14, wherein the execution unit also executes the prescribed contract procedure for the secondary product contents, according to the prescribed information for the prescribed contract procedure attached to the secondary product contents, when the utilization of the secondary product contents is specified.

16. The information processing device of claim 7, wherein the processing unit enables the utilization of the secondary product contents created by a secondary product creator without paying any raw material fees to raw material providers of the raw material contents, when an end-user of the secondary product contents pays a raw material fee to each raw material provider of each raw material contents upon executing the contract procedure for each raw material contents by the execution unit.

17. A contents distribution method for enabling utilization of a secondary product contents containing one or more raw material contents which are encrypted by using an encryption key and to which an information for a contract procedure to enable utilization of the raw material contents is attached, the contents distribution method comprising:
   (a) maintaining the encryption key of the raw material contents at a server device; and
   (b) acquiring the encryption key of the raw material contents from the server device, decrypting the raw material contents by using the encryption key and enabling the utilization of the secondary product contents, by executing the contract procedure according to the information for the contract procedure attached to the raw material contents at a client device when the utilization of the secondary product contents is specified;
   wherein the step (b) dynamically determines a price of each raw material contents constituting the secondary product contents according to prices of other raw material contents constituting the secondary product contents.

18. The contents distribution method of claim 17, wherein at the step (b), the client device executes the contract procedure for each raw material contents specified from the secondary product contents, according to the information for the contract procedure attached to each raw material contents.

19. The contents distribution method of claim 17, wherein at the step (b), the client device executes the contract procedure between an end-user of the secondary product contents and a raw material contents provider of each raw material contents.

20. The contents distribution method of claim 17, wherein at the step (b), the client device enables the secondary product contents which is encrypted by using a prescribed encryption key, the prescribed encryption key being registered in the server device, and a prescribed information for a prescribed contract procedure to enable the utilization of the secondary product contents being attached to the secondary product contents.

21. The contents distribution method of claim 20, wherein at the step (b), the client device also executes the prescribed contract procedure for the secondary product contents, according to the prescribed information for the prescribed contract procedure attached to the secondary product contents, when the utilization of the secondary product contents is specified.

22. The contents distribution method of claim 17, wherein at the step (b), the client device enables the utilization of the secondary product contents created by a secondary product creator without paying any raw material fees to raw material providers of the raw material contents, when an end-user of the secondary product contents pays a raw material fee to each raw material provider of each raw material contents upon executing the contract procedure for each raw material contents.

23. A computer program product embodied on a computer readable media for causing a computer to function as an information processing device for enabling utilization of a secondary product contents containing one or more raw material contents which are encrypted by using an encryption key and to which an information for a contract procedure to enable utilization of the raw material contents is attached, the computer program product comprising:
   first computer program codes for causing the computer to execute the contract procedure according to the information for the contract procedure attached to the raw material contents when the utilization of the secondary product contents is specified; and
   second computer program codes for causing the computer to acquire the encryption key of the raw material contents from a server that maintains the encryption key of the raw material contents, decrypt the raw material contents by using the encryption key and enable the utilization of the secondary product contents when the contract procedure is executed by the first computer program codes;
   wherein the first computer program codes dynamically determine a price of each raw material contents constituting the second product contents according to prices of other raw material contents constituting the secondary product contents.

24. A method for providing a contents distribution service, comprising:
   providing a secondary product contents containing one or more raw material contents which are encrypted by using an encryption key and to which an information for a contract procedure to enable utilization of the raw material contents is attached, the secondary product contents being created by a secondary product creator without paying any raw material fees to raw material providers of the raw material contents;
   executing the contract procedure according to the information for the contract procedure attached to the raw material contents when the utilization of the secondary product contents is specified; and
   acquiring the encryption key of the raw material contents from a server device that maintains the encryption key of the raw material contents at a server device, decrypting the raw material contents by using the encryption key and enabling the utilization of the secondary product contents, when an end-user of the secondary product contents pays a raw material fee to each raw material provider of each raw material contents upon executing the contract procedure for each raw material contents;

wherein the executing step dynamically determines a price of each raw material contents constituting the secondary product contents according to prices of other raw material contents constituting the secondary product contents.

\* \* \* \* \*